(12) United States Patent
Pawar et al.

(10) Patent No.: US 12,045,489 B2
(45) Date of Patent: Jul. 23, 2024

(54) FAST RESYNCHRONIZATION OF A MIRRORED AGGREGATE USING DISK-LEVEL CLONING

(71) Applicant: NetApp, Inc., San Jose, CA (US)

(72) Inventors: Sangramsinh Pandurang Pawar, Bedford, MA (US); Bhoovaraghan Subramanian, Cary, NC (US); William Derby Dallas, Merrimack, NH (US); Sowkoor Sunad Bhandary, Morrisville, NC (US); Rajesh Rajarman, Action, MA (US); FNU Sahasranshu, Cary, NC (US)

(73) Assignee: NetApp, Inc., San Jose, CA (US)

( * ) Notice: Subject to any disclaimer, the term of this patent is extended or adjusted under 35 U.S.C. 154(b) by 16 days.

(21) Appl. No.: 18/060,367

(22) Filed: Nov. 30, 2022

(65) Prior Publication Data

US 2024/0143215 A1 May 2, 2024

Related U.S. Application Data

(60) Provisional application No. 63/381,380, filed on Oct. 28, 2022.

(51) Int. Cl.
*G06F 3/06* (2006.01)
(52) U.S. Cl.
CPC .......... *G06F 3/0646* (2013.01); *G06F 3/0604* (2013.01); *G06F 3/067* (2013.01)
(58) Field of Classification Search
CPC ...... G06F 3/0646; G06F 3/0604; G06F 3/067; G06F 3/0689; G06F 3/0619; G06F 11/1076; G06F 11/2094; G06F 3/065
See application file for complete search history.

(56) References Cited

U.S. PATENT DOCUMENTS

| | | | |
|---|---|---|---|
| 2002/0194529 A1* | 12/2002 | Doucette | G06F 11/2064 714/E11.102 |
| 2014/0149787 A1* | 5/2014 | Shanbhag | G06F 11/1662 714/6.22 |

OTHER PUBLICATIONS

Amazon EC2., "Amazon Elastic Compute Cloud: User Guide for Linux Instances," Amazon Web Services, pp. 1-1912, 2022.
Amazon Web Services., "AWS CLI Command Reference," User Guide, 2022, pp. 1-15.

(Continued)

*Primary Examiner* — Jane W Benner
(74) *Attorney, Agent, or Firm* — Jaffery Watson Mendonsa & Hamilton LLP

(57) ABSTRACT

Systems and methods for performing a fast resynchronization of a mirrored aggregate of a distributed storage system using disk-level cloning are provided. According to one embodiment, responsive to a failure of a disk of a plex of the mirrored aggregate utilized by a high-availability (HA) pair of nodes of a distributed storage system, disk-level clones of the disks of the healthy plex may be created external to the distributed storage system and attached to the degraded HA partner node. After detection of the cloned disks by the degraded HA partner node, mirror protection may be efficiently re-established by assimilating the cloned disks within the failed plex and then resynchronizing the mirrored aggregate by performing a level-1 resync of the failed plex with the healthy plex based on a base file system snapshot of the healthy plex. In this manner, a more time-consuming level-0 resync may be avoided.

24 Claims, 21 Drawing Sheets

(56) References Cited

OTHER PUBLICATIONS

NetApp., "Data Mirroring using SyncMirror," Jun. 7, 2022, 2 pages.
Network Appliance, "Network Appliance SyncMirror Software," Storage Solutions, Sep. 20, 2002, 2 pages.

\* cited by examiner

FAST RESYNCHRONIZATION OF A MIRRORED AGGREGATE USING DISK-LEVEL CLONING

CROSS-REFERENCE TO RELATED APPLICATIONS

This application claims the benefit of priority of U.S. Provisional Application No. 63/381,380, filed Oct. 28, 2022, the contents of which are hereby incorporated by reference in their entirety for all purposes.

BACKGROUND

Field

Various embodiments of the present disclosure generally relate to storage systems, mirroring, and high availability. In particular, some embodiments relate to an approach for reducing the time associated with re-establishing mirror protection within a high-availability (HA) pair of a cluster of storage systems by leveraging disk-level cloning (e.g., disk cloning tool or cloud-native disk snapshots).

Description of the Related Art

In a cloud environment, virtual storage systems may make use of non-shared storage (e.g., cloud volumes presented as disks to the file system). Mirror protection for a dataset stored by a primary virtual storage system of an HA pair may be provided by performing real-time mirroring of data from storage associated with the primary virtual storage system to storage associated with a secondary virtual storage system of the HA pair. In some storage systems, an object (which may be referred to herein as an "aggregate") may present a set of disks under a contiguous namespace, organized into one or more redundant array of independent disks (RAID) groups. The unit of mirroring (which may be referred to herein as a "plex") may include one or more RAID groups of an aggregate. The mirroring of a plex of the primary virtual storage system to a plex of the secondary storage system effectively creates a RAID level 1 relationship between the two plexes.

SUMMARY

Systems and methods are described for performing a fast resynchronization of a mirrored aggregate of a distributed storage system using disk-level cloning. According to one embodiment, a mirrored aggregate is maintained by a high-availability (HA) pair of nodes of a distributed storage system. The mirrored aggregate includes a first plex having a first redundant array of independent disks (RAID) group associated with a first HA partner node of the HA pair and a second plex having a second RAID group associated with a second HA partner node of the HA pair. After mirror protection provided by the mirrored aggregate is no longer available as a result of a failure of a disk within the first RAID group, it is determined that multiple cloned disks have been attached to the first HA partner node. Each cloned disk represents a disk-level clone of a corresponding disk of the second plex. The mirror protection is re-established based at least on the cloned disks. For example, the cloned disks may be assimilated within the first plex and then the mirrored aggregate may be resynchronized by performing a level-1 resynchronization of the first plex with the second plex based on a base file system snapshot of the second plex.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
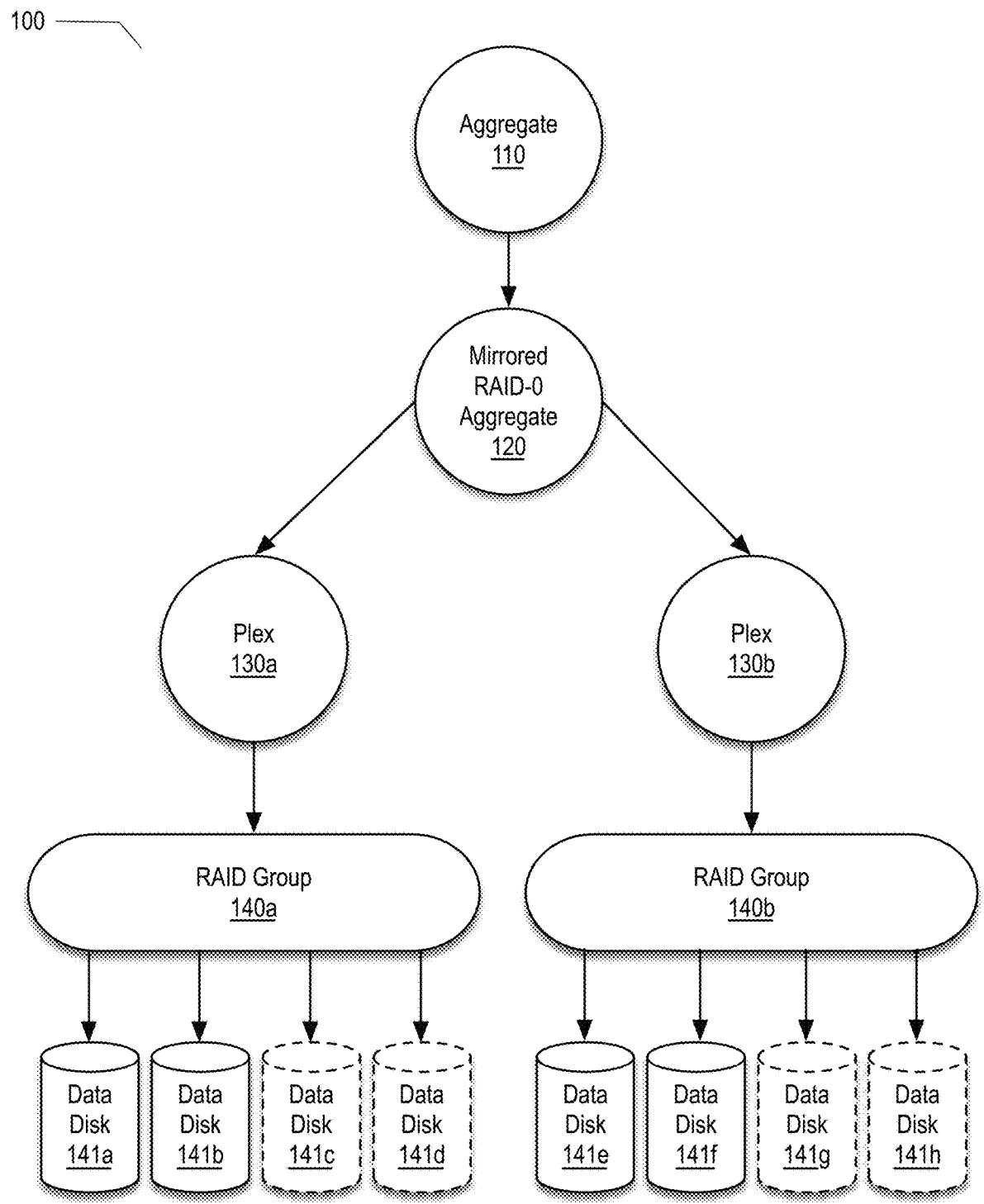
FIG. 1 is a block diagram illustrating an example of a mirrored RAID-0 aggregate.

Systems and methods are described for performing a fast resynchronization of a mirrored aggregate of a distributed storage system using disk-level cloning. As noted above, mirror protection within an HA pair of virtual storage systems may involve real-time mirroring of data from a healthy plex of a first virtual storage system (e.g., a primary HA node) to a healthy plex of a second virtual storage system (e.g., a secondary HA node) via synchronous mirroring functionality (e.g., NetApp SyncMirror, available from NetApp, Inc. of San Jose, CA) supported by the distributed storage system. This mirroring may be performed at the RAID level. In the context of a distributed storage system hosted by a hyperscaler or cloud provider, the one or more RAID groups of a plex may make use of RAID level 0 (which may also be referred to herein as RAID-0 or striping). Because the data is distributed across the disks of a RAID-0 RAID group, the speed of read and write operations increases as more disks are added to the RAID group; however, RAID-0 cannot tolerate a single permanent disk failure.

Reappearance of the same disk to a virtual storage system of the distributed storage system as a result of resolution of a temporary disk failure, for example, by the hyperscaler may be addressed by the virtual storage system performing an incremental recovery by way of a file system or aggregate-level snapshot based resynchronization (which may be referred to herein as a "level-1 resync"). When the disk failure is permanent, however, the existence of a prior aggregate-level snapshot is of no use, thereby rendering the incremental recovery ineffective in this scenario. Rather, at present, re-establishment of mirror protection after a permanent disk failure currently involves deleting the failed plex from the aggregate, attaching spare disks to the pool used by the virtual storage system at issue, and re-mirroring the aggregate via a "level-0 resync," which represents a deep copy of all the blocks from the healthy (surviving) plex into the newly created plex. Such a full resync may take a very long time to complete. For example, depending on the amount of data at issue, a level-0 resync may take days or weeks to complete.

Various embodiments described herein seek to significantly reduce the amount of time for resynchronizing a mirrored RAID-0 aggregate. For example, when disk-level cloning functionality is available (e.g., an off-box disk-level cloning tool or cloud-native disk-level snapshot, such as an Amazon Web Services (AWS) Elastic Compute Cloud (EC2) Snapshot), a level-1 resync may be used in place of the level-0 resync to bring the completion time down to minutes or hours. According to one embodiment, a mirrored aggregate is maintained by a high-availability (HA) pair of nodes of a distributed storage system. The mirrored aggregate includes a first plex having a first RAID group (e.g., a RAID-0 RAID group) associated with a first HA partner node of the HA pair and a second plex having a second RAID group (e.g., a RAID-0 RAID group) associated with a second HA partner node of the HA pair.

Because the cloud volumes are managed by the hyperscaler, typically, it is the hyperscaler that becomes aware of a permanent failure of a given disk. As such, handling of a permanent disk failure generally involves coordinated actions by the hyperscaler and the distributed storage system. After mirror protection provided by the mirrored aggregate is no longer available as a result of a failure of a disk within the first RAID group, an end-user (e.g., an administrative user of a hyperscaler hosting the distributed storage system), or other external actor (e.g., an automated script, or a third-party node) may use an API exposed by the hyperscaler or a CLI of the hyperscaler (e.g., the AWS console) to make disk-level snapshots of the disks of the second plex (the healthy or surviving plex). In one embodiment, the distributed storage system facilitate coordinated action and automation by exposing an API or CLI through which, among other things, a fast resync job may be started directly or indirectly (e.g., via an orchestration layer) by the external actor. The same or a different method of the API may be used to obtain volumed identifiers (IDs) of the disks of the healthy plex to facilitate automation of the disk-level cloning. After the cloned disks have been created (e.g., by the hyperscaler), they may then be attached to a cloud instance (e.g., a virtual machine (VM)) hosting the first HA partner node via the API or CLI of the hyperscaler, for example, based on a node ID of the first HA partner node provided by the distributed storage system via the exposed API. After it is determined by the distributed storage system that the cloned disks have been attached to the first HA partner node, mirror protection may be efficiently re-established by assimilating the cloned disks within the first plex and then resynchronizing the mirrored aggregate by performing a level-1 resync of the first plex with the second plex based on a base file system snapshot of the second plex.

While various examples are described with reference to an HA pair of nodes of a cluster of virtual storage systems representing a distributed storage system, it is to be appreciated the methodologies described herein are not limited to virtual storage systems hosted in a cloud environment and are equally applicable to on-prem storage systems.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

As used herein a "cloud" or "cloud environment" broadly and generally refers to a platform through which cloud computing may be delivered via a public network (e.g., the Internet) and/or a private network. The National Institute of Standards and Technology (NIST) defines cloud computing as "a model for enabling ubiquitous, convenient, on-demand network access to a shared pool of configurable computing resources (e.g., networks, servers, storage, applications, and services) that can be rapidly provisioned and released with minimal management effort or service provider interaction." P. Mell, T. Grance, The NIST Definition of Cloud Computing, National Institute of Standards and Technology, USA, 2011. The infrastructure of a cloud may be deployed in accordance with various deployment models, including private cloud, community cloud, public cloud, and hybrid cloud. In the private cloud deployment model, the cloud infrastructure is provisioned for exclusive use by a single organization comprising multiple consumers (e.g., business units), may be owned, managed, and operated by the organization, a third party, or some combination of them, and may exist on or off premises. In the community cloud deployment model, the cloud infrastructure is provisioned for exclusive use by a specific community of consumers from organizations that have shared concerns (e.g., mission, security requirements, policy, and compliance considerations), may be owned, managed, and operated by one or more of the organizations in the community, a third party, or some combination of them, and may exist on or off premises. In the public cloud deployment model, the cloud infrastructure is provisioned for open use by the general public, may be owned, managed, and operated by a cloud provider or hyperscaler (e.g., a business, academic, or government organization, or some combination of them), and exists on the premises of the cloud provider. The cloud service provider may offer a cloud-based platform, infrastructure, application, or storage services as-a-service, in accordance with a number of service models, including Software-as-a-Service (SaaS), Platform-as-a-Service (PaaS), and/or Infrastructure-as-a-Service (IaaS). In the hybrid cloud deployment model, the cloud infrastructure is a composition of two or more distinct cloud infrastructures (private, community, or public) that remain unique entities, but are bound together by standardized or proprietary technology that enables data and application portability (e.g., cloud bursting for load balancing between clouds).

As used herein a "cloud volume" generally refers to persistent storage that is accessible to a virtual storage system by virtue of the persistent storage being associated with a compute instance in which the virtual storage system is running. A cloud volume may represent a hard-disk drive (HDD) or a solid-state drive (SSD) from a pool of storage devices within a cloud environment that is connected to the compute instance through Ethernet or fibre channel (FC) switches as is the case for network-attached storage (NAS) or a storage area network (SAN). Non-limiting examples of cloud volumes include various types of SSD volumes (e.g., AWS Elastic Block Store (EBS) gp2, gp3, io1, and io2 volumes for EC2 instances) and various types of HDD volumes (e.g., AWS EBS st1 and sc 1 volumes for EC2 instances).

An "aggregate" generally refers to an object that presents a collection of disks under a contiguous namespace, organized into one or more RAID groups.

A "mirrored aggregate" generally refers to a special type of aggregate having two plexes (copies of their data). When synchronous replication is enabled for a mirrored aggregate the two plexes are updated simultaneously so that the plexes are identical. The mirroring of a plex of a primary HA node of an HA pair of a distributed storage system to a plex of a secondary HA node of the HA pair effectively creates a RAID level 1 relationship between the two plexes, thereby allowing a healthy HA partner of the HA pair to take over for a failed HA partner of the HA pair. In various examples described herein a mirrored aggregate represents a mirrored RAID-0 aggregate containing one or more RAID groups of 2 to 4 disks each across which client data is striped and stored.

A "plex" generally represents a unit of mirroring and includes one or more RAID groups comprised of multiple disks or array logical unit numbers (LUNs). A plex is a physical copy of a file system or the disks holding the data within the aggregate.

Example Mirrored Aggregate

FIG. 1 is a block diagram 100 illustrating an example of a mirrored RAID-0 aggregate 120. The mirrored RAID-0 aggregate may represent a special type of aggregate 110 that includes two plexes 130a-b. In the context of the present example, plex 130a is shown including a first RAID group 140a having 2 to 4 data disks 141a-d and plex 130b is shown including a second RAID group 140b having 2 to 4 data disks 141e-h. When a distributed storage system is hosted within a cloud environment, the data disks 141a-h may be backed by cloud volumes provided by a hyperscaler.

Assuming a primary node of an HA pair of a distributed storage system is associated with data disks 141a-d and a secondary node of the HA pair is associated with data disks 141e-h, mirror protection may be provided to the HA pair by performing synchronous mirroring of data from plex 130a to plex 130b. As described further below, should a disk (e.g., data disk 141a) fail within plex 130b, the RAID-0 mirrored aggregate will enter into a degraded state in which mirror protection is no longer available. When the failure is temporary, the disk may reappear to the primary node and a level-1 resync may be performed to reestablish mirror protection. However, as noted above, at present when the failure is permanent, a more in-depth level-0 resync is performed to reestablish mirror protection. In one embodiment, a fast resync process may be used to quickly reestablish the mirror protection provided by the RAID-0 mirrored aggregate 120 by replacing data disks 141e-h of plex 130b (the failed plex) with disk-level clones of plex 130a (the healthy plex) and performing a level-1 resync based on a base file system-level (aggregate-level) snapshot.

While for sake of brevity in the context of the present example only a single RAID group is shown within each plex, it is to be appreciated each plex may include multiple RAID groups.

Example Operating Environment

Figure 2:
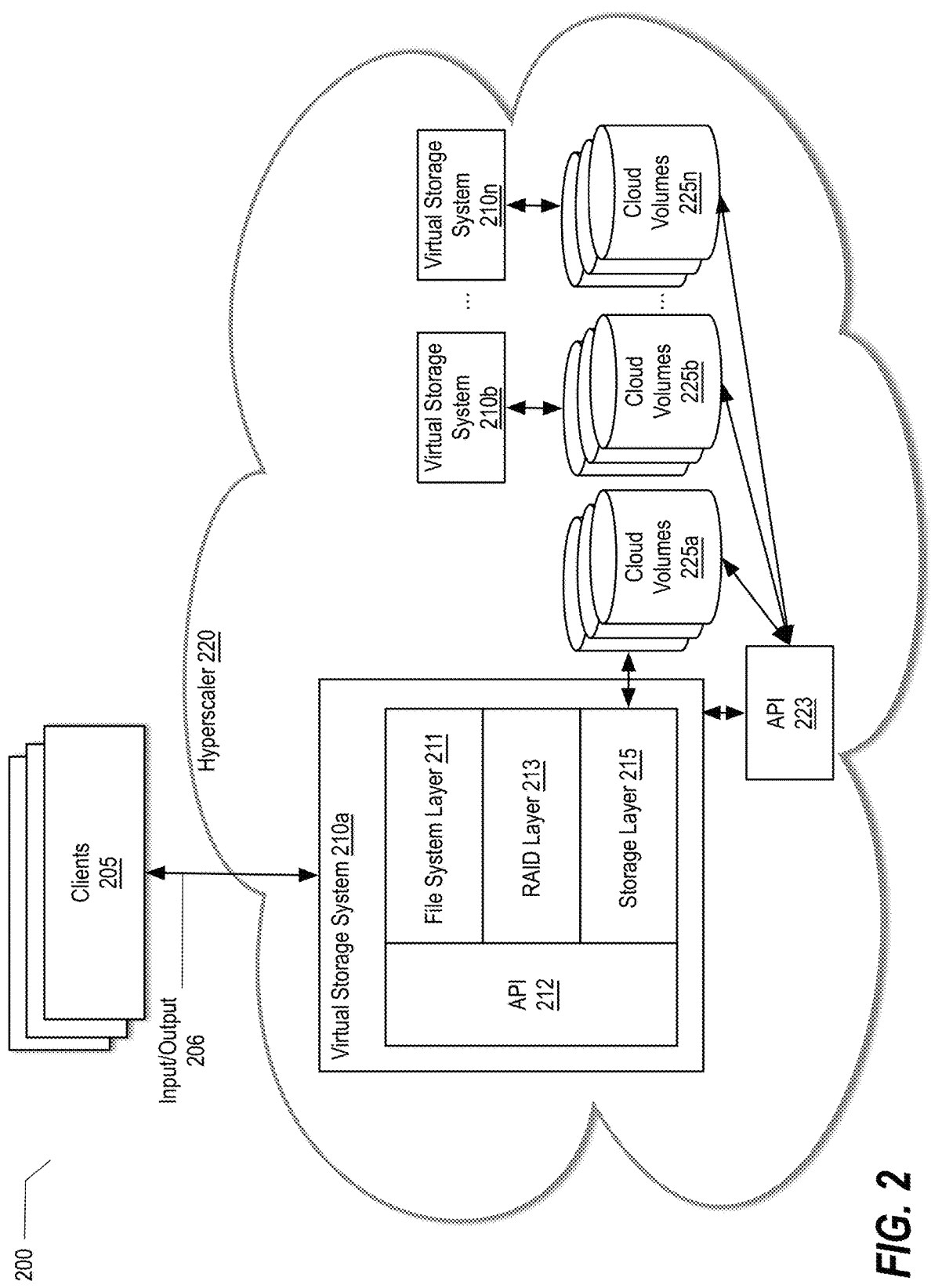
FIG. 2 is a high-level block diagram conceptually illustrating a distributed storage system in the form of a cluster of virtual storage systems with respective sets of hyperscale volumes in accordance with an embodiment of the present disclosure.

FIG. 2 is a block diagram illustrating an environment 200 in which various embodiments may be implemented. In various examples described herein, a virtual storage system 210a, which may be considered exemplary of virtual storage systems 210b-n, may be run (e.g., on a VM or as a containerized instance, as the case may be) within a public cloud provided by a public cloud provider (e.g., hyperscaler 220). The virtual storage systems 210a-n may be part of a cluster of nodes that collectively represent a distributed storage system. In the context of the present example, each virtual storage system 210a-n makes use of a respective set of cloud volumes 225a-n provided by the hyperscaler, for example, in the form of solid-state drive (SSD) backed or hard-disk drive (HDD) backed disks.

The virtual storage system 210a may present storage over a network to clients 205 using various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. Clients 205 may request services of the virtual storage system 210 by issuing Input/Output requests 206 (e.g., file system protocol messages (in the form of packets) over the network). A representative client of clients 205 may comprise an application, such as a database application, executing on a computer that "connects" to the distributed storage system over a computer network, such as a point-to-point link, a shared local area network (LAN), a wide area network (WAN), or a virtual private network (VPN) implemented over a public network, such as the Internet.

In the context of the present example, the virtual storage system 210a is shown including a number of layers, including a file system layer 211 and one or more intermediate storage layers (e.g., a RAID layer 213 and a storage layer 215). These layers may represent components of data management software (not shown) of the virtual storage system 210. The file system layer 211 generally defines the basic interfaces and data structures in support of file system operations (e.g., initialization, mounting, unmounting, creating files, creating directories, opening files, writing to files, and reading from files). A non-limiting example of the file system layer 211 is the Write Anywhere File Layout (WAFL) Copy-on-Write file system (which represents a component or layer of ONTAP software available from NetApp, Inc. of San Jose, CA).

The RAID layer 213 may be responsible for, among other things, encapsulating data storage virtualization technology for combining multiple cloud volumes 225 into RAID groups, for example, for purposes of data redundancy, performance improvement, or both. The storage layer 215 may include storage drivers for interacting with the various types of cloud volumes 225 supported by the hyperscaler 220. Depending upon the particular implementation the file system layer 211 may persist data to the cloud volumes 225 using one or both of the RAID layer 213 and the storage layer 215.

Various storage device level operations, including, but not limited to, creating a volume, deleting a volume, attaching a volume to a compute instance, removing a volume from a plex, obtaining information regarding a specified volume or all volumes attached to a specific compute instance, may be performed via a CLI or API (e.g., API 223) exposed by the hyperscaler 220. A non-limiting example of API 223 in the context of AWS is the EC2 API.

As shown, the distributed storage system may expose an API 212 through which an external actor (e.g., an administrative user of hyperscaler 220, an automated script, or a third-party node) may initiate and participate in facilitation of a fast resync process. The external actor (and/or an intermediate orchestration layer through which the external actor interacts with API 212) may also be referred to herein as an "API consumer." A non-limiting example of API 212 is a representational state transfer (REST) API. In one embodiment, as described further below, rather than recovering from a disk failure and the resulting loss of mirror protection by performing a level-0 resync, using a combination of API calls to API 223 and API 212, disk-level clones of the healthy plex may be created, attached to a cloud instance (e.g., a VM) hosting the virtual storage system 210 associated with the failed plex, and used to efficiently reestablish mirror protection via a level-1 resync.

Example Step-By-Step Illustration of a Fast Resync Process

Figure 3A:
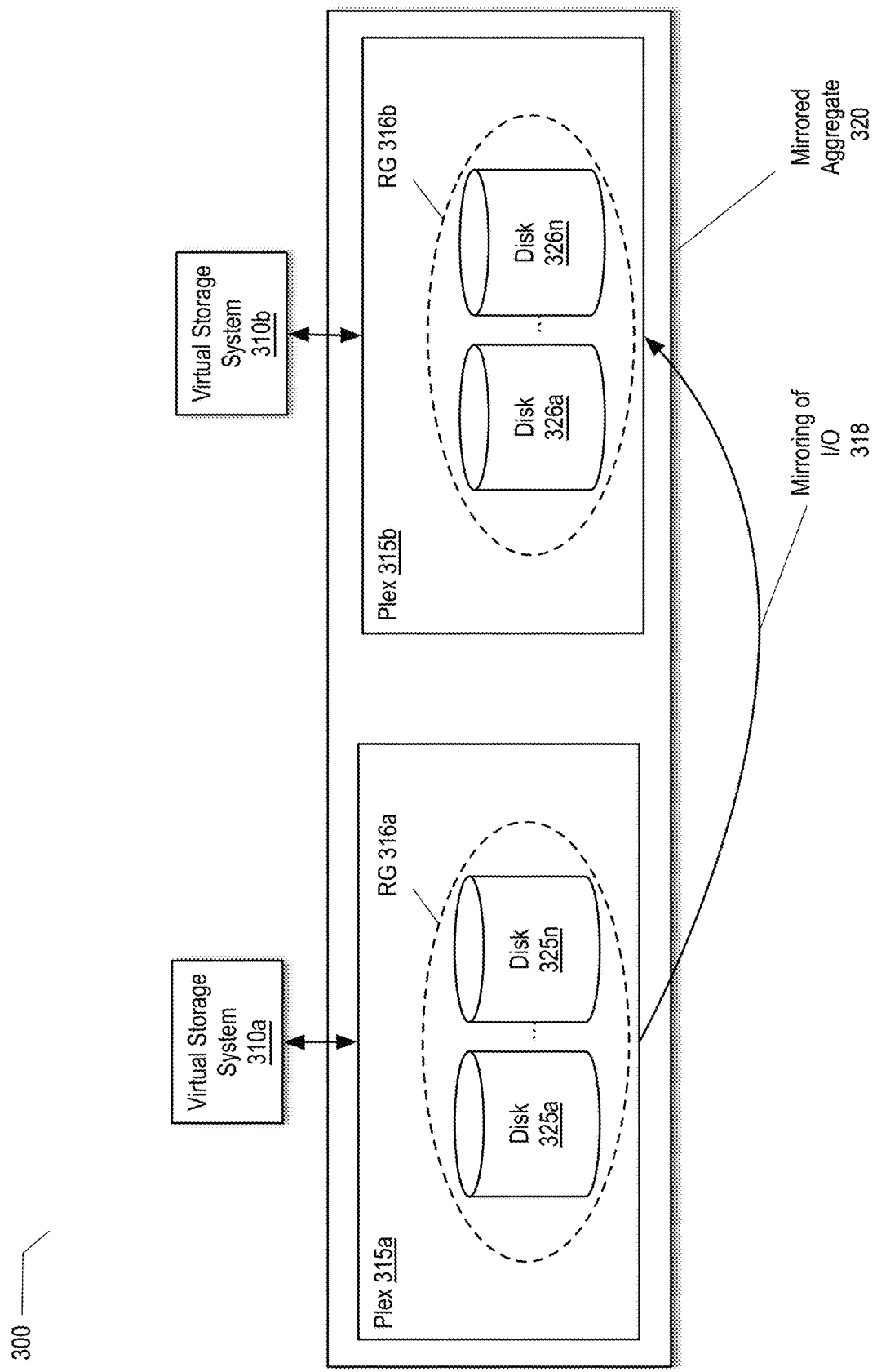
FIG. 3A is a block diagram conceptually illustrating an initial state of a distributed storage system in which a mirrored aggregate is healthy and I/O mirroring is being performed from a primary high-availability (HA) partner node to a secondary HA partner node in accordance with an embodiment of the present disclosure.

FIG. 3A is a block diagram conceptually illustrating an initial state of a distributed storage system 300 in which a mirrored aggregate 320 (e.g., a mirrored RAID-0 aggregate) is healthy and I/O mirroring 318 is being performed from a primary high-availability (HA) partner node (e.g., virtual storage system 310a, which may be analogous to virtual storage system 210a) to a secondary HA partner node (e.g., virtual storage system 310b, which may be analogous to virtual storage system 210b) in accordance with an embodiment of the present disclosure. In the context of the present example, the mirrored aggregate 320 includes a first plex 315a and a second plex 315b having respective RAID groups 316a and 316b, respectively. RAID group 316a is shown including disks 325a-n (which may be backed by a set of cloud volumes 225) associated with the primary HA partner node and RAID group 316b is shown including disks 326a-n (which may be backed by a separate set of cloud volumes 225) associated with the secondary HA partner node.

Figure 3B:
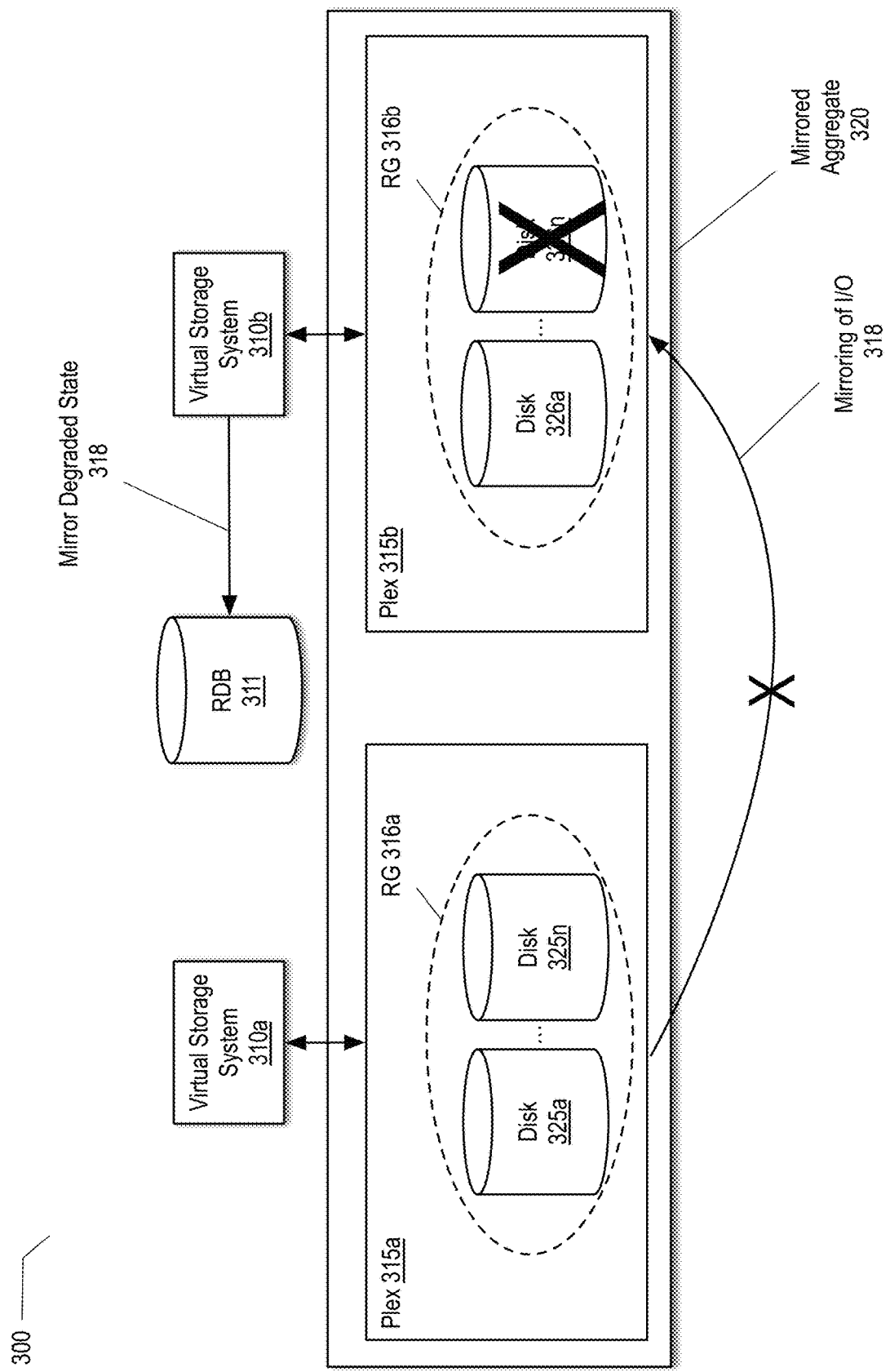
FIG. 3B is a block diagram conceptually illustrating the distributed storage system of FIG. 3A after a disk has failed within a plex of the secondary HA partner node in accordance with an embodiment of the present disclosure.

FIG. 3B is a block diagram conceptually illustrating the distributed storage system 300 of FIG. 3A after a disk (e.g., disk 326n) has failed within plex 315b of the secondary HA partner node in accordance with an embodiment of the present disclosure. In the context of the present example, after detecting the disk failure, the secondary HA partner node may update a configuration database (e.g., replicated database (RDB) 311) to indicate the mirrored aggregate 320 is now operating in a mirror degraded state 319 in which mirror protection is no longer available. The configuration database may store cluster-wide configuration information, for example, including relationship information specifying the status and direction of data replication for the mirrored aggregate 320.

According to one embodiment, when the primary HA partner observes the mirrored aggregate 320 is in the mirror degraded state, it may discontinue performance of the I/O mirroring 318 from plex 315a to plex 315b.

Figure 3C:
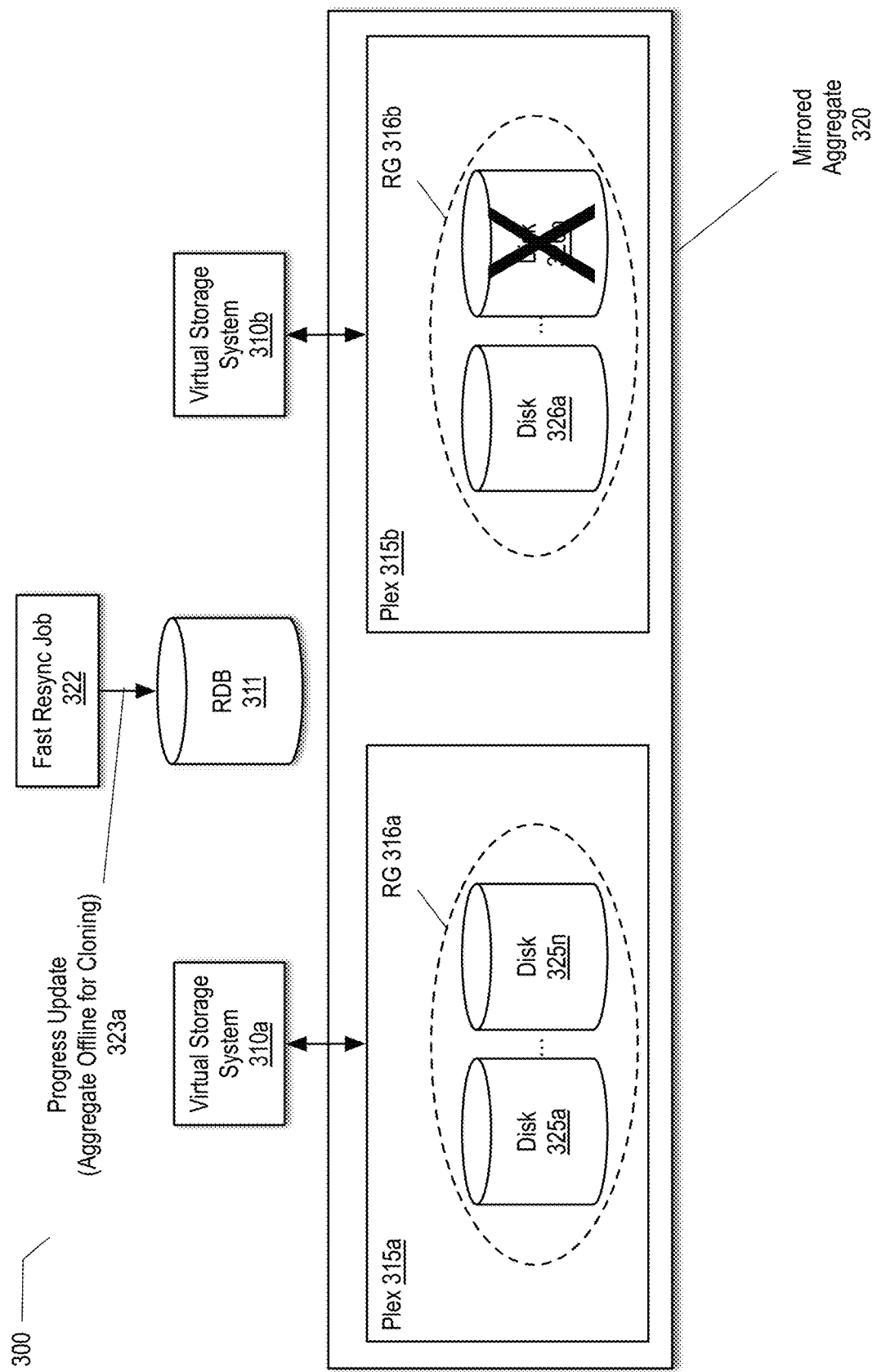
FIG. 3C is a block diagram conceptually illustrating the distributed storage system of FIG. 3B after a fast resync job has been started in accordance with an embodiment of the present disclosure.

FIG. 3C is a block diagram conceptually illustrating the distributed storage system 300 of FIG. 3B after a fast resync job 322 has been started in accordance with an embodiment of the present disclosure. As described further below, in one embodiment, the fast resync job 322 may be created responsive to invocation of a method (e.g., a PATCH method) of an API (e.g., API 212) by an external actor. The fast resync job 322 may be responsible for evaluating various preconditions (e.g., an environment variable or bootarg indicating support for fast resync is true, the HA pair is in a healthy state, the mirrored aggregate is in a mirror degraded state, with a failed plex, and no other fast resync job is in progress across the cluster) for performing a fast resync process. Assuming such preconditions are satisfied, the fast resync job 322 may run until the mirrored aggregate 320 comes back up with two healthy plexes and may be further responsible for updating the status of the fast resync process at various points during the process. In the context of the present example, the API call represents a request to take the mirrored aggregate 320 offline to allow disk-level snapshots to be taken of the disks (e.g., disks 325a-n) of the healthy plex 315a. Responsive to the API call and successful offlining of the mirrored aggregate 320, the fast resync job 322 may store a progress update 323a for the fast resync process indicating the mirrored aggregate 320 is now offline for cloning. The external actor may monitor the progress via another method (e.g., a GET method) of the API. In one embodiment, the GET method returns the volume IDs of the disks of the healthy plex after the mirrored aggregate 320 has been successfully taken offline.

In one embodiment, the tracking of progress or status of the fast resync process (which may also be referred to as mirrored aggregate resync state) within RDB 311 facilitates resumption of the fast resync process should either of the nodes of the HA pair shutdown or reboot during the fast resync process. Information regarding the status may also be exposed (e.g., via the API) to an external actor, for example, to facilitate interactions with the external actor. The status may be represented by one of a number of enumerated values (e.g., inactive, offline_for_cloning, waiting_for_online, waiting_for_cloned_disks, as sign_cloned_disks_in_progress, waiting_for_cloned_plex_online, resyncing, complete, and failed). The initial status of the fast resync process may be "inactive."

Figure 3D:
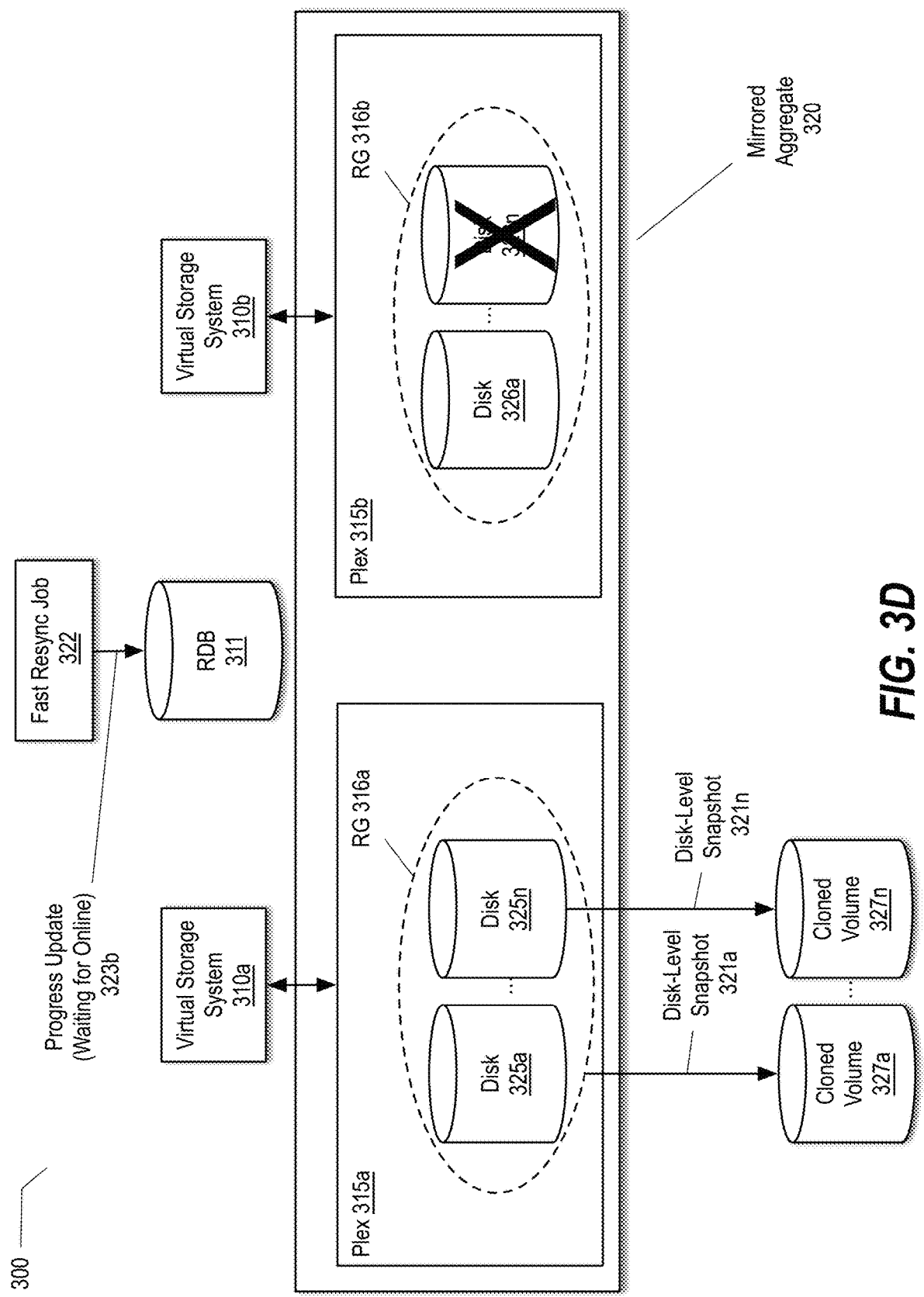
FIG. 3D is a block diagram conceptually illustrating the distributed storage system of FIG. 3C in which disk-level clones of disks of a healthy plex are used to create cloned volumes in accordance with an embodiment of the present disclosure.

FIG. 3D is a block diagram conceptually illustrating the distributed storage system 300 of FIG. 3C in which disk-level snapshots 321a-n of disks of the healthy plex are used to create cloned volumes 327a-n in accordance with an embodiment of the present disclosure. According to one embodiment, the disk-level snapshots 321a-n are captured by disk-level cloning functionality external to the distributed storage system 300. For example, in an on-premise environment, an off-box disk-level cloning tool may be used to make individual clones of disks 325a-n, whereas in a cloud environment, a hyperscaler API call may be used to take the disk-level snapshots 321a-n of disks 325a-n. In the context of the present example, after the disk-level snapshots 321a-n have been completed, an external actor may invoke a method (e.g., a PATCH method) of an API (e.g., API 212) to direct the distributed storage system 300 to bring the mirrored aggregate 320 back online. Responsive to this API call, the fast resync job 322 may store a progress update 323b to the configuration database indicating the fast resync process is waiting for the mirrored aggregated 320 to come back online.

Figure 3E:
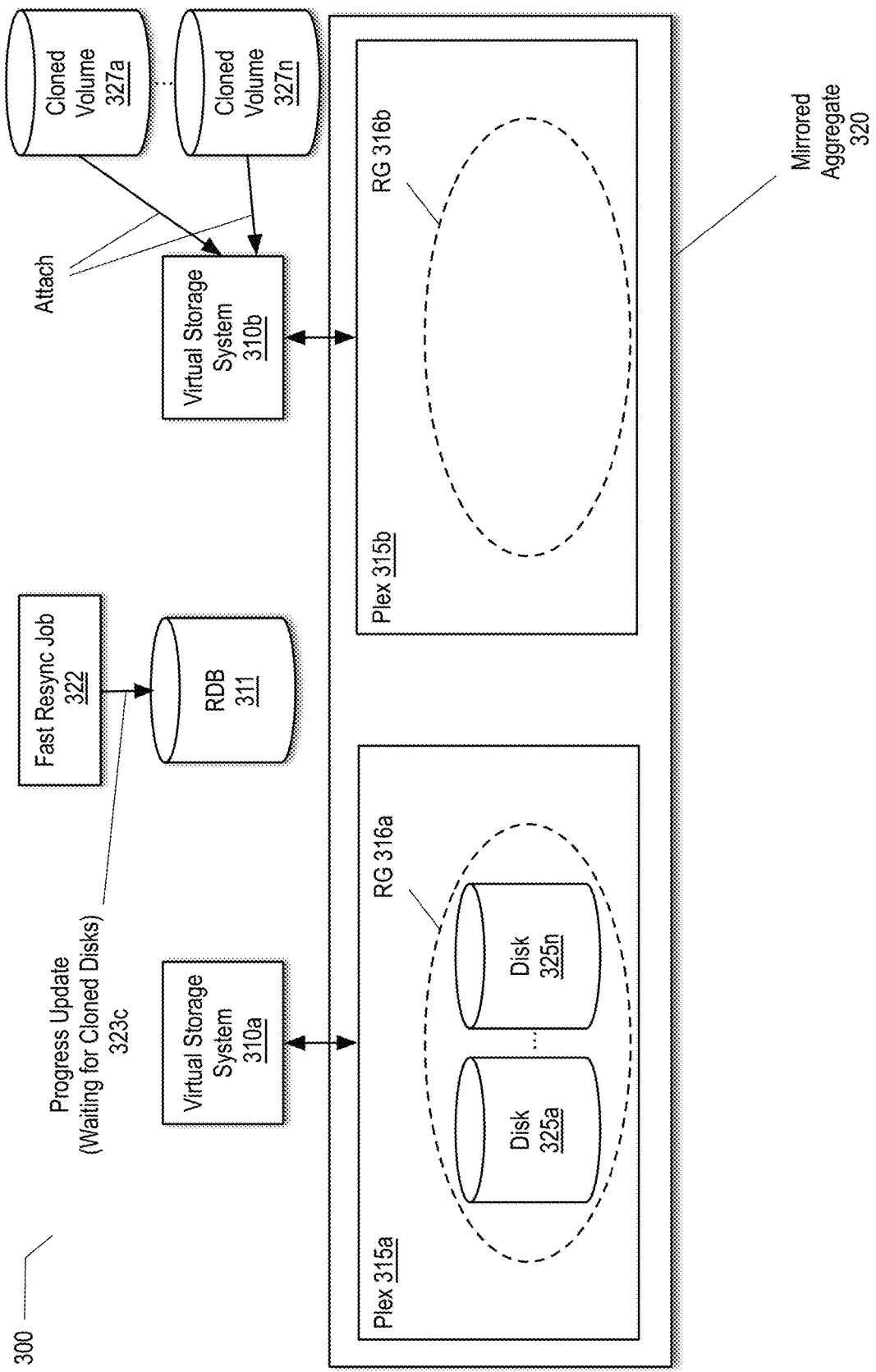
FIG. 3E is a block diagram conceptually illustrating the distributed storage system of FIG. 3D in which the cloned volumes have been attached to the secondary HA partner node in accordance with an embodiment of the present disclosure.

FIG. 3E is a block diagram conceptually illustrating the distributed storage system 300 of FIG. 3D in which the cloned volumes have been attached to the secondary HA partner node in accordance with an embodiment of the present disclosure. After the mirrored aggregate 320 is back online, the fast resync job 322 may store a progress update 323c to the configuration database indicating the fast resync process is waiting for cloned disks. According to one embodiment, after the external actor has completed the disk-level snapshots 321a-n, the external actor may monitor the progress via another method (e.g., a GET method) of the API. In one embodiment, after the mirrored aggregate 320 is back online, the GET method returns the node ID of the virtual storage system associated with the failed plex, which in this example is the secondary HA partner node. At this point, the external actor may proceed with creating the cloud volumes 327a-n based on the disk-level snapshots 321a-n, detaching the disks from the failed plex, and attaching the cloned volumes 327a-n to the cloud instance hosting the secondary HA partner node. As described further below, responsive to the cloned volumes 327a-n being attached to the compute instance, the compute instance may generate disk attach events to be handled by a storage layer (e.g., storage layer 215) of the secondary HA partner node.

Figure 3F:
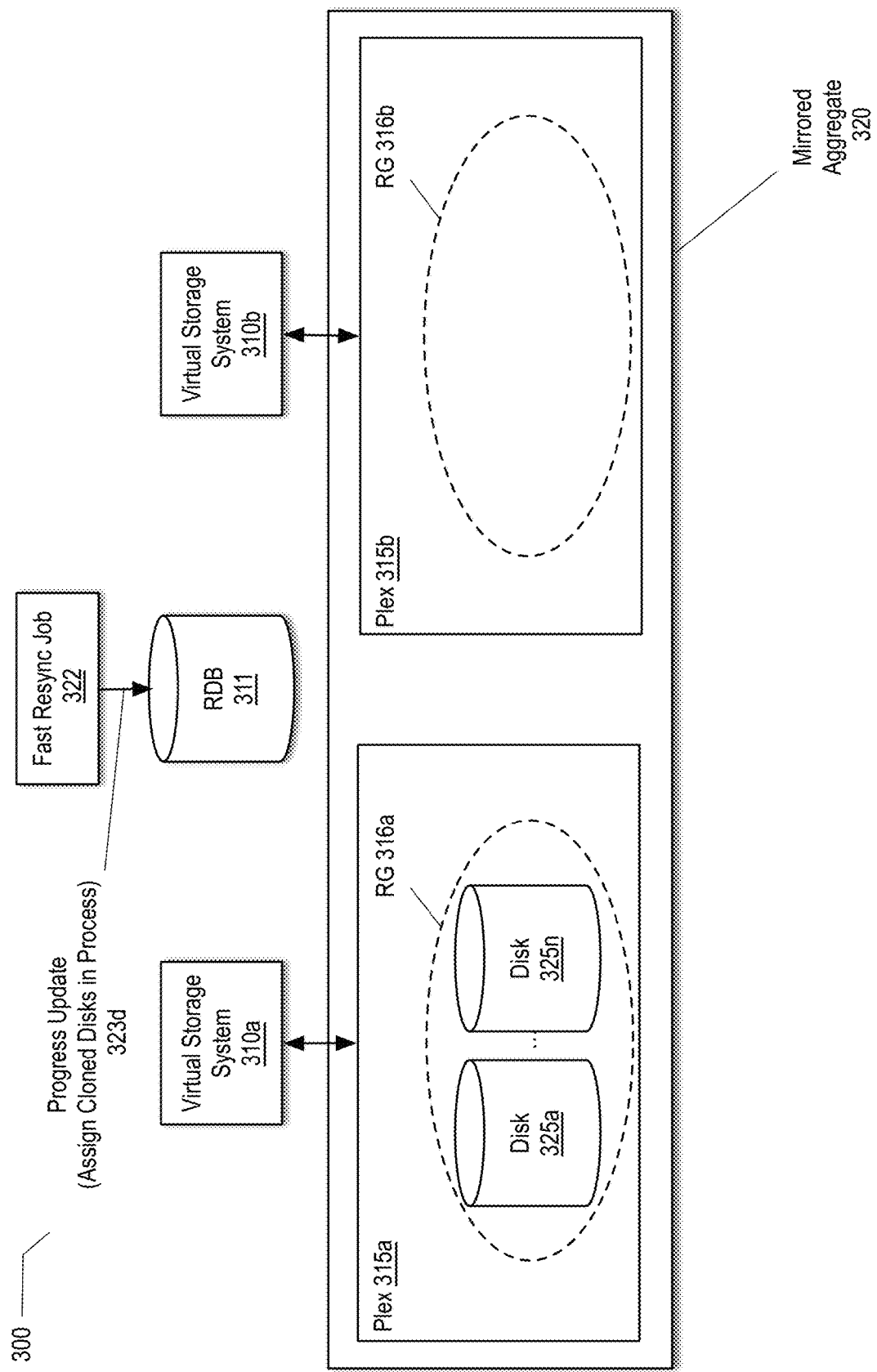
FIG. 3F is a block diagram conceptually illustrating the distributed storage system of FIG. 3E after the cloned volumes have been detected as being attached to the secondary HA partner node in accordance with an embodiment of the present disclosure.

FIG. 3F is a block diagram conceptually illustrating the distributed storage system 300 of FIG. 3E after the cloned volumes 327a-n have been detected as being attached to the secondary HA partner node in accordance with an embodiment of the present disclosure. In the context of the present example, after the cloned volumes 327a-n have been detected by the secondary HA partner node, the fast resync job 322 may store a progress update 323d for the fast resync process indicating the assignment of cloned disks is in process. As described further below, in one embodiment, the assignment of the cloned disks may involve assigning the cloned disks 327a-n to a pool of disks associated with plex 315b.

Figure 3G:
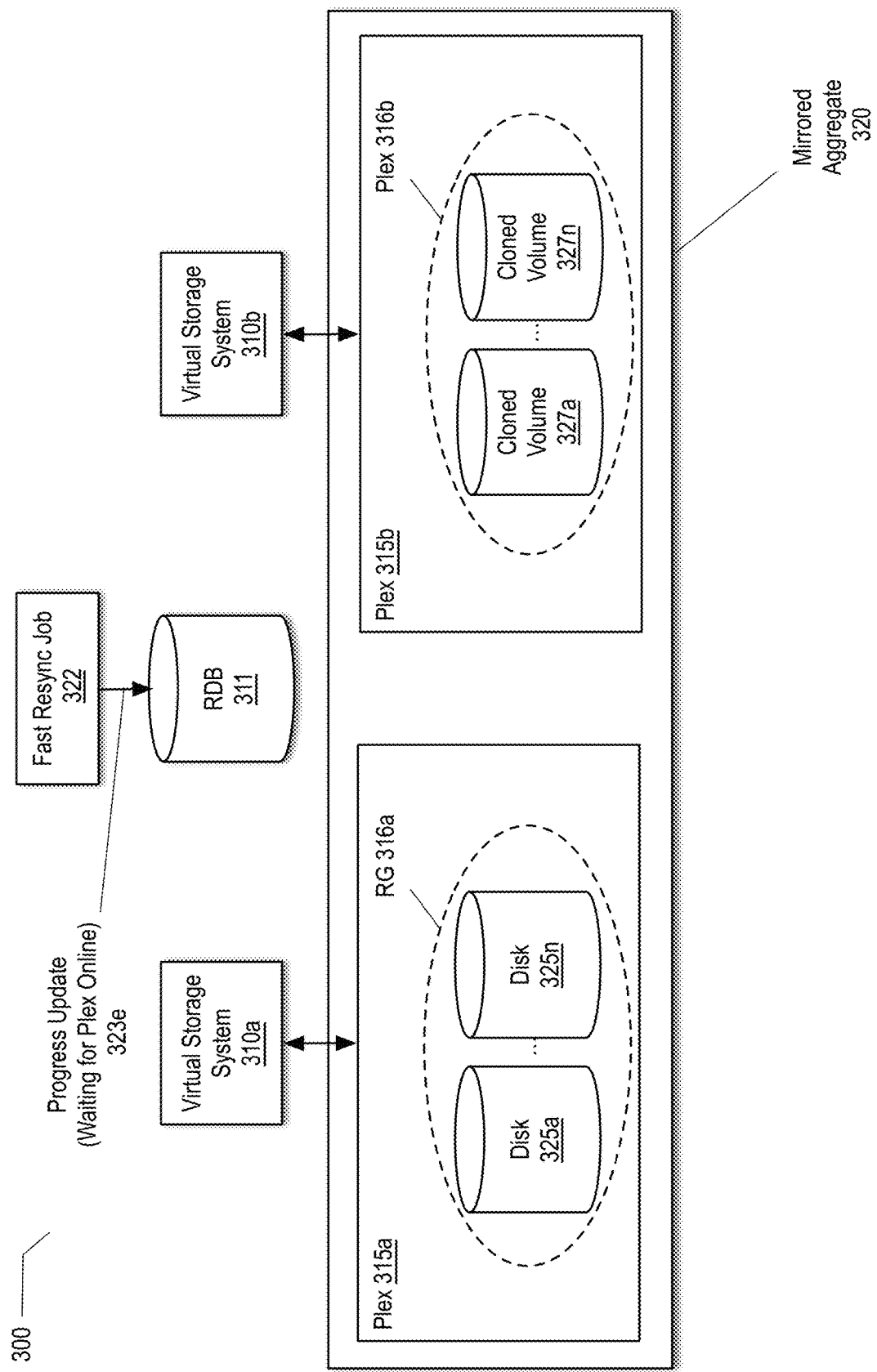
FIG. 3G is a block diagram conceptually illustrating the distributed storage system of FIG. 3F in which the cloned volumes are being assimilated into the plex of the secondary HA partner node in accordance with an embodiment of the present disclosure.

FIG. 3G is a block diagram conceptually illustrating the distributed storage system of FIG. 3F in which the cloned volumes 327a-n are being assimilated into the plex of the secondary HA partner node in accordance with an embodiment of the present disclosure. In the context of the present example, after the cloned volumes 327a-n have been initialized by a storage layer (e.g., storage layer 215) and after assignment of the cloned disks 327a-n has been completed, a RAID layer (e.g., RAID layer 213) of the secondary HA partner node may begin assimilating the cloned disks 327a-n into plex 315b and the fast resync job 322 may store a progress update 323e for the fast resync process indicating the fast resync process is waiting for the plex 315b to come online.

Figure 3H:
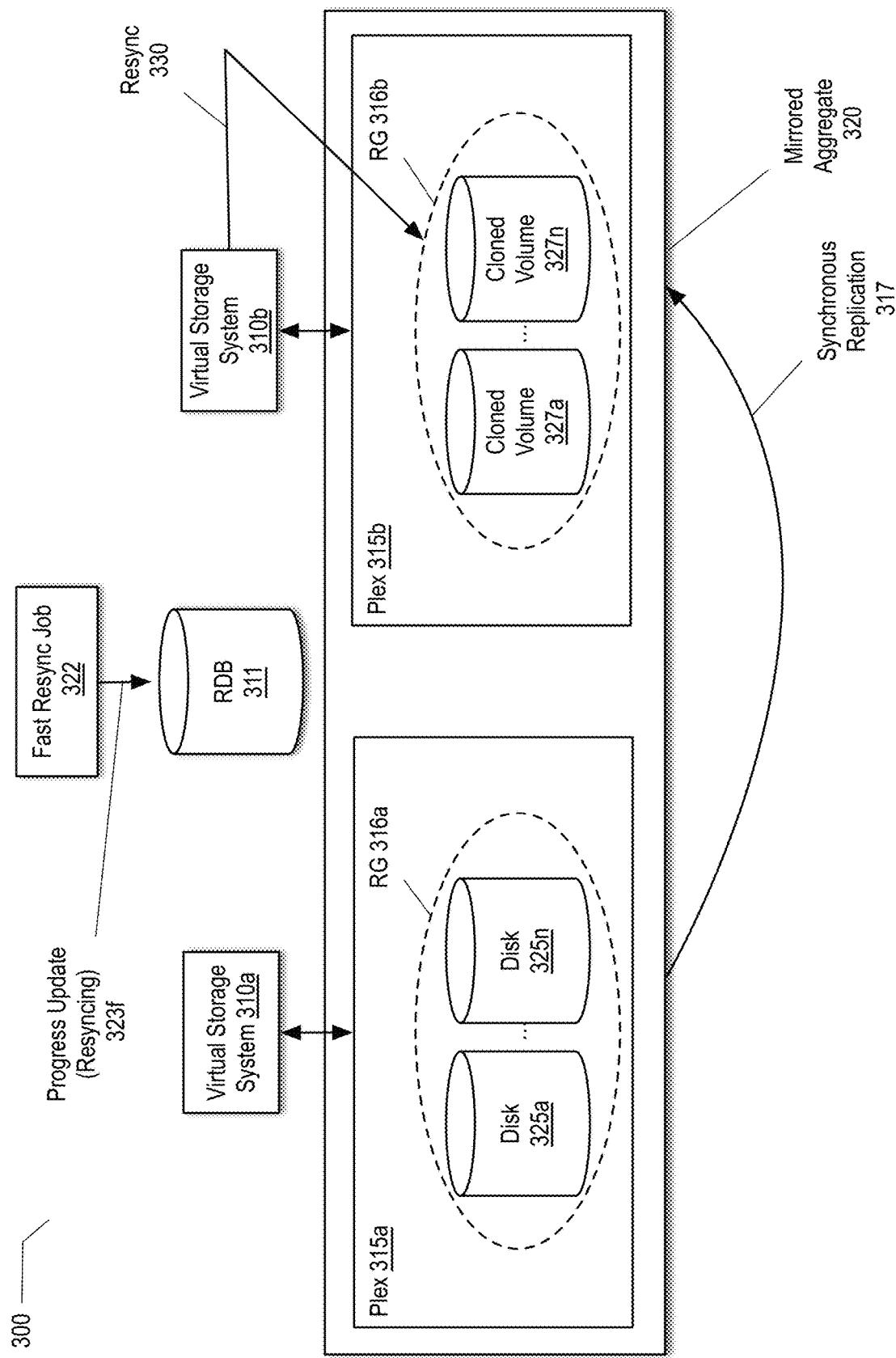
FIG. 3H is a block diagram conceptually illustrating the distributed storage system of FIG. 3G in which the mirrored aggregate is being resynchronized in accordance with an embodiment of the present disclosure.

FIG. 3H is a block diagram conceptually illustrating the distributed storage system 300 of FIG. 3G in which the mirrored aggregate 320 is being resynchronized in accordance with an embodiment of the present disclosure. In the context of the present example, after assimilation of the cloned disks 327a-n within the plex 315b has been completed and the plex 315b comes online, the fast resync job 322 may store a progress update 323f for the fast resync process indicating resyncing of the mirrored aggregate 320 is in process.

At this point, in the fast resync process, the RAID layer starts a level-1 resync process to bring the mirrored aggregate 320 back into a healthy state in which mirror protection may be re-established. As described further below, the level-1 resync process may resynchronize plex 315b with plex 315a based on the cloned volumes 327a-n and a base file system (aggregate-level) snapshot to bring the mirrored aggregate 320 back into a state of synchronization.

Figure 3I:
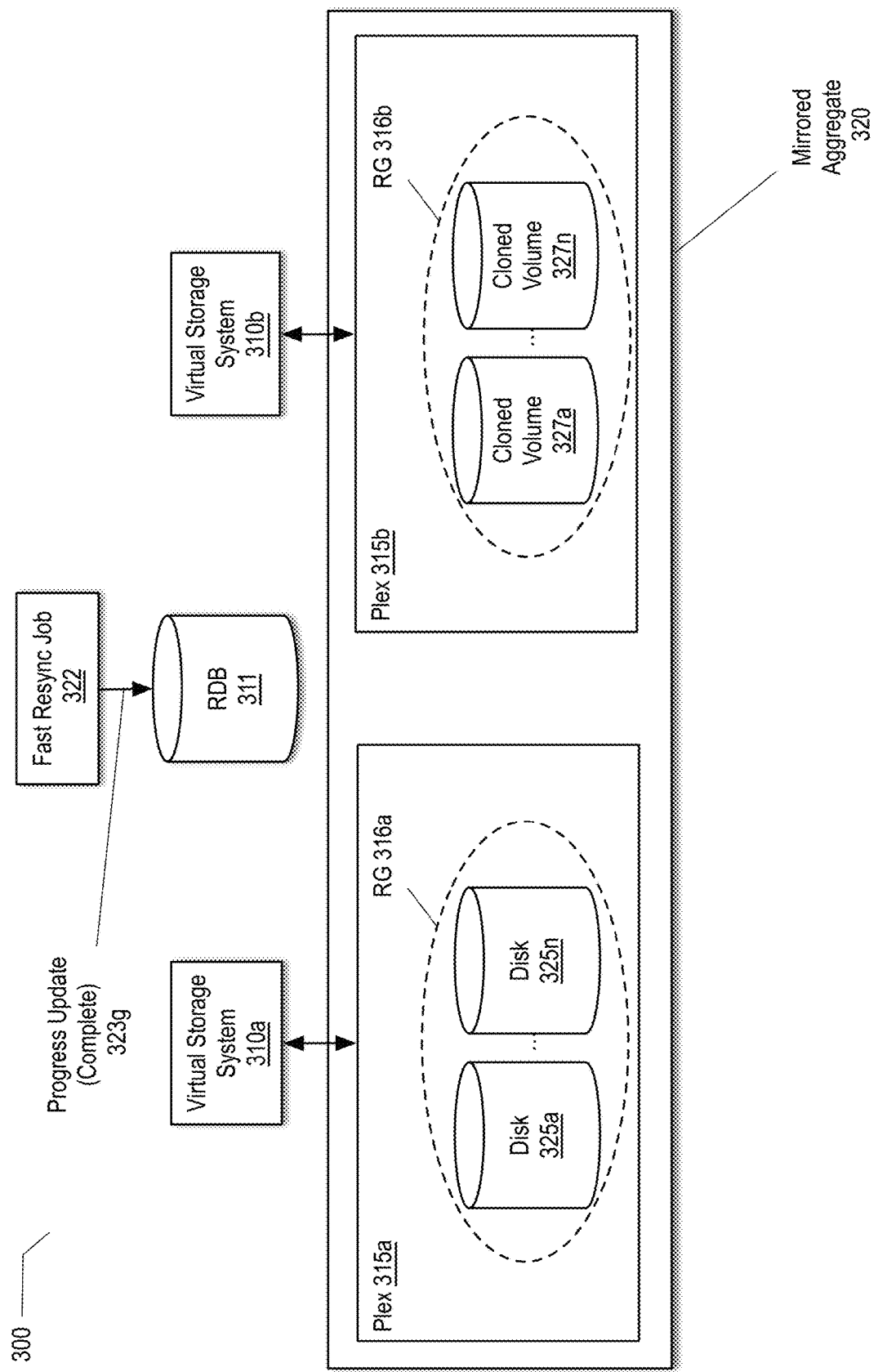
FIG. 3I is a block diagram conceptually illustrating the distributed storage system of FIG. 3H after the resynchronization of the mirrored aggregate has been completed in accordance with an embodiment of the present disclosure.

FIG. 3I is a block diagram conceptually illustrating the distributed storage system 300 of FIG. 3H after the resynchronization of the mirrored aggregate 320 has been completed in accordance with an embodiment of the present disclosure. In the context of the present example, after determining resync 330 (e.g., including synchronous replication 317) of the mirrored aggregate 320 has been completed, the fast resync job 322 may store a progress update 323g for the fast resync process indicating resyncing of the mirrored aggregate 320 is complete.

Figure 3J:
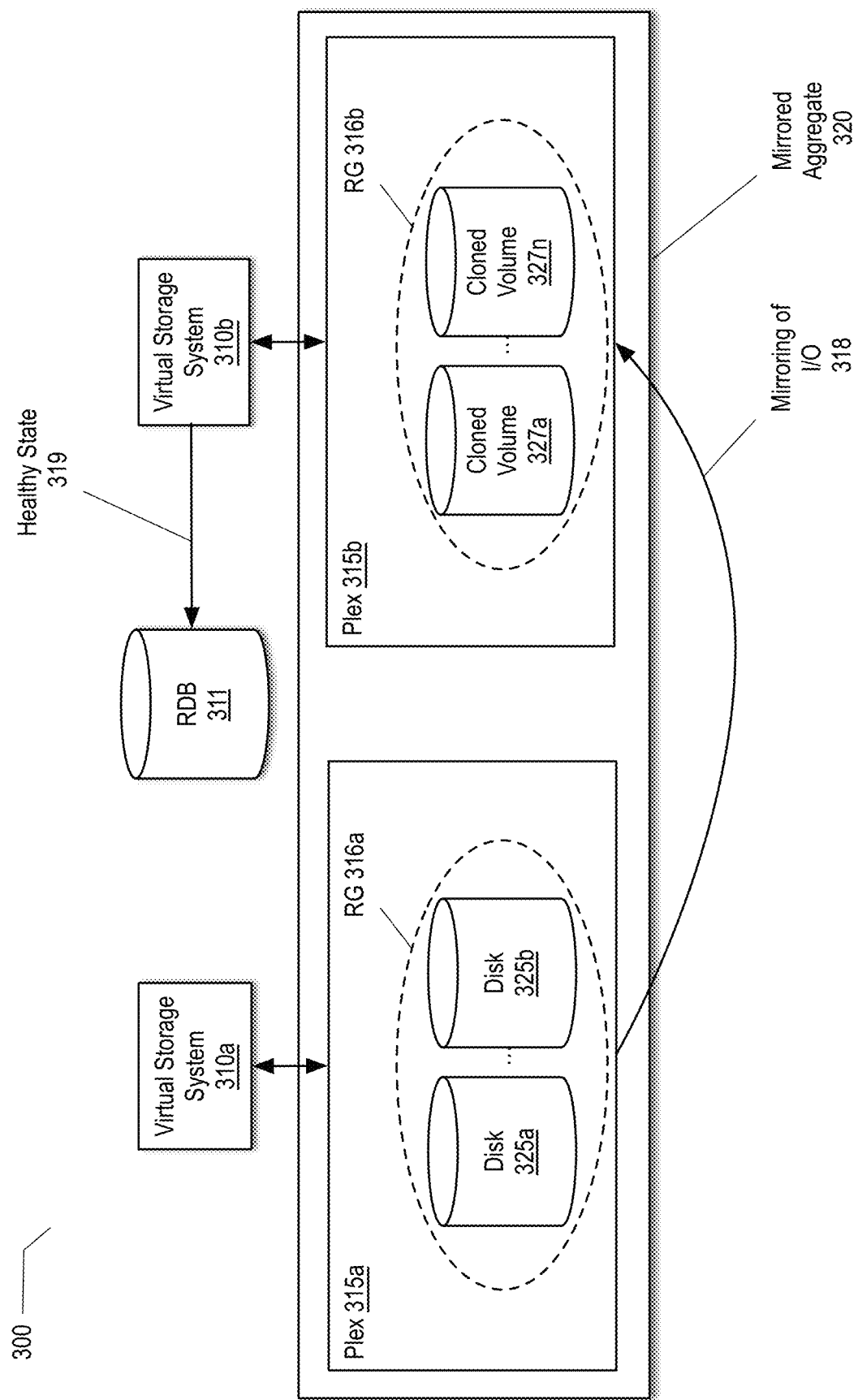
FIG. 3J is a block diagram conceptually illustrating the distributed storage system of FIG. 3I after mirror protection has been re-established in accordance with an embodiment of the present disclosure.

FIG. 3J is a block diagram conceptually illustrating the distributed storage system 300 of FIG. 3I after mirror protection has been re-established in accordance with an embodiment of the present disclosure. In the context of the present example, after resyncing of the mirror aggregate 320 has been completed, the secondary HA partner node may update the configuration database to indicate the mirrored aggregate 320 is now in a healthy state 319 in which mirror protection may be re-established. According to one embodiment, when the primary HA partner observes the mirrored aggregate 320 is in the healthy state, it may resume performance of the mirroring of I/O 318 from plex 315a to plex 315b, thereby re-establishing mirror protection on behalf of the HA pair.

Example Fast Resync of a Mirrored Aggregate

Figure 4:
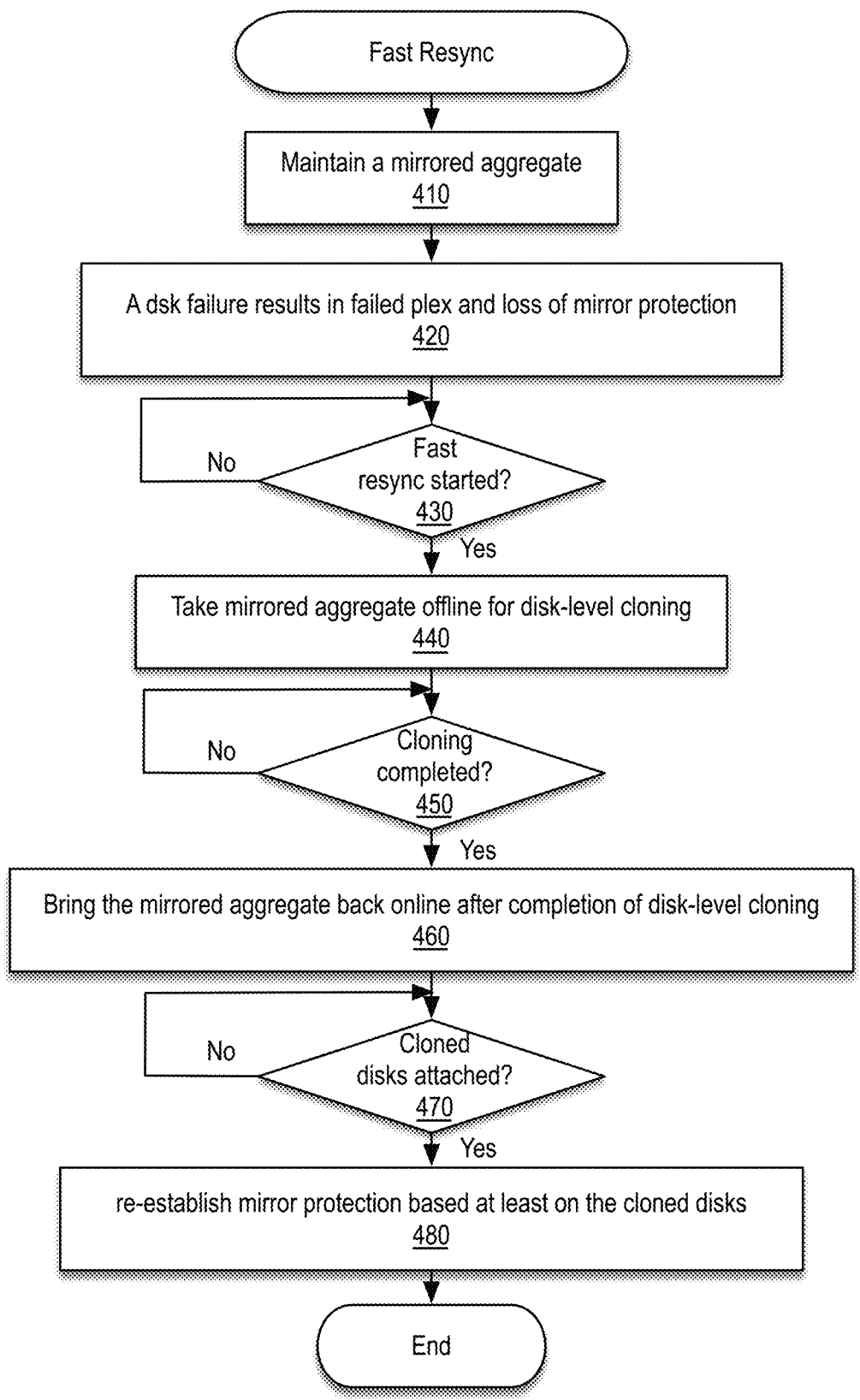
FIG. 4 is a high-level flow diagram illustrating operations for performing a fast resync of a mirrored aggregate in accordance with an embodiment of the present disclosure.

FIG. 4 is a high-level flow diagram illustrating operations for performing a fast resync of a mirrored aggregate in accordance with an embodiment of the present disclosure. The processing described with reference to FIG. 4 may be performed by various processes (e.g., fast resync job 322) associated with a distributed storage system (e.g., distributed storage system 300). In the context of the present example, the distributed storage system provides an end-to-end framework, including an API (e.g., API 212) exposed by the distributed storage system to facilitate orchestration of the fast resync process by an actor external to the distributed storage system. The external actor may be an administrative user of a hyperscaler (e.g., hyperscaler 220), an automated script, or a third-party node. For example, the automated script may be a script owned by a support department of the hyperscaler that interacts directly or indirectly with one or both of the API and the hyperscaler API (e.g., API 223).

At block 410, a mirrored aggregate (e.g., mirrored aggregate 320) is maintained. For example, an HA pair of nodes (e.g., virtual storage systems 310a and 310b) of the distributed storage system may each be associated with a respective set of disks (e.g., disks 325a-n and disks 326a-n) that are part of respective RAID groups (e.g., RG 316a and RG 316b) of respective plexes (e.g., plex 315a and plex 315b) of the mirrored aggregate. According to one embodiment, synchronous replication (e.g., synchronous replication 317) is enabled for the mirrored aggregate to cause the two plexes to be updated simultaneously (e.g., at a consistency point) so as to maintain mirror protection on behalf of the HA pair. According to one embodiment, the mirrored aggregate is maintained with synchronous mirroring functionality (e.g., NetApp SyncMirror) provided by the distributed storage system. The synchronous mirroring functionality may perform real-time mirroring of data from a plex associated with a primary HA partner node of the HA pair to a plex associated with a secondary HA partner node of the HA pair, for example, responsive to I/O operations resulting in a modification of the data.

At block 420, a disk failure results in a failed plex and loss of mirror protection. For example, as described above with reference to FIG. 3B, disk 326n of plex 315b may fail causing the mirrored aggregate to enter into a mirror degraded state.

At decision block 430, it is determined whether a fast resync for the mirrored aggregate has been started. According to one embodiment, a fast resync job (e.g., fast resync job 322) may be created for the mirrored aggregate responsive to an actor external to the distributed storage system invoking a method of the API exposed by the distributed storage system. For example, the external actor may call a PATCH method of the API with the universally unique identifier (UUID) of the mirrored aggregate to start the fast resync job, which may represent cluster-wide unique job. If the PATCH method has not been called, fast resync processing loops back to decision block 430; otherwise, if the PATCH method has been called, processing continues with block 440.

At block 440, the mirrored aggregate is taken offline for disk-level cloning to be performed. A non-limiting example of various components of the distributed storage system that may be involved and various operations that may be performed in connection with taking the mirrored aggregate offline are described further below with reference to FIGS. 5 and 8A.

At decision block 450, it is determined whether cloning has been completed. As noted above, in one embodiment, fast resync of the mirrored aggregate makes use of cloned volumes (e.g., cloned volumes 327a-n) representing disk-level clones of the disks associated with the healthy plex (e.g., plex 315a). According to one embodiment, an external actor is responsible for creating the cloned volumes and attaching the cloned volumes to a compute instance within a cloud environment hosting the virtual storage system (e.g., virtual storage system 310b—the secondary HA partner node) having the failed plex and informing the distributed storage system when the disk-level cloning has been completed. In one embodiment, the external actor may inform the distributed storage system regarding completion of the disk-level cloning by invoking an API (e.g., API 212) exposed by the distributed storage system. For example, the external actor may call a PATCH method of the API with the UUID of the mirrored aggregate and a parameter indicating the mirrored aggregate is to be brought back online. If the PATCH method has not been called, fast resync processing loops back to decision block 450; otherwise, if the PATCH method has been called, processing continues with block 460.

At block 460, the mirrored aggregate is brought back online. A non-limiting example of various components of the distributed storage system that may be involved and various operations that may be performed in connection with bringing the mirrored aggregate back online after disk-level cloning has been completed are described further below with reference to FIGS. 5 and 8B.

After disk-level cloning has been completed, the external actor may proceed to attach the cloned disks to the compute instance hosting the virtual storage system (e.g., virtual storage system 310b—the secondary HA partner node) having the failed plex. In one embodiment, the external actor waits for the mirrored aggregate to be brought back online before attaching the cloned disks to the compute instance and obtains the node ID of the appropriate compute instance via polling of a GET method call. When the mirrored aggregate has returned to an online state, the GET method may return the node ID.

At decision block 470, it is determined whether the cloned disks have been attached. If so, processing continues with block 480; otherwise, processing loops back to block 470 to await attachment of the cloned disks.

At block 480, mirror protection is re-established based at least on the cloned disks. According to one embodiment, responsive to disks being attached to the compute instance, disk attach events may be generated and handled by a storage layer (e.g., storage layer 215) of the hosted virtual storage system (e.g., virtual storage system 310*b*—the secondary HA partner node) having the failed plex. As described further below, according to one embodiment, the fast resync job checks for the cloned disks and initiates disk assignment responsive to the cloned disks being attached. After the cloned disks have been initialized by the storage layer (e.g., storage layer 218), the RAID layer (e.g., RAID layer 213) assimilates the cloned disks into the plex, brings the plex online, and starts a level-1 resync based on the cloned disks and a base file system (aggregate-level) snapshot of the disks of the healthy plex (e.g., plex 315*a*) to bring the mirrored aggregate back into a healthy state at which point synchronous replication (e.g., synchronous replication 317 from plex 315*a* to plex 315*b*) may be resumed to re-establish mirror protection on behalf of the HA pair. A non-limiting example of various components of the distributed storage system that may be involved and various operations that may be performed in connection with re-establishing mirror protection are described further below with reference to FIGS. 5 and 8C.

Example Architecture of a Virtual Storage System

Figure 5:
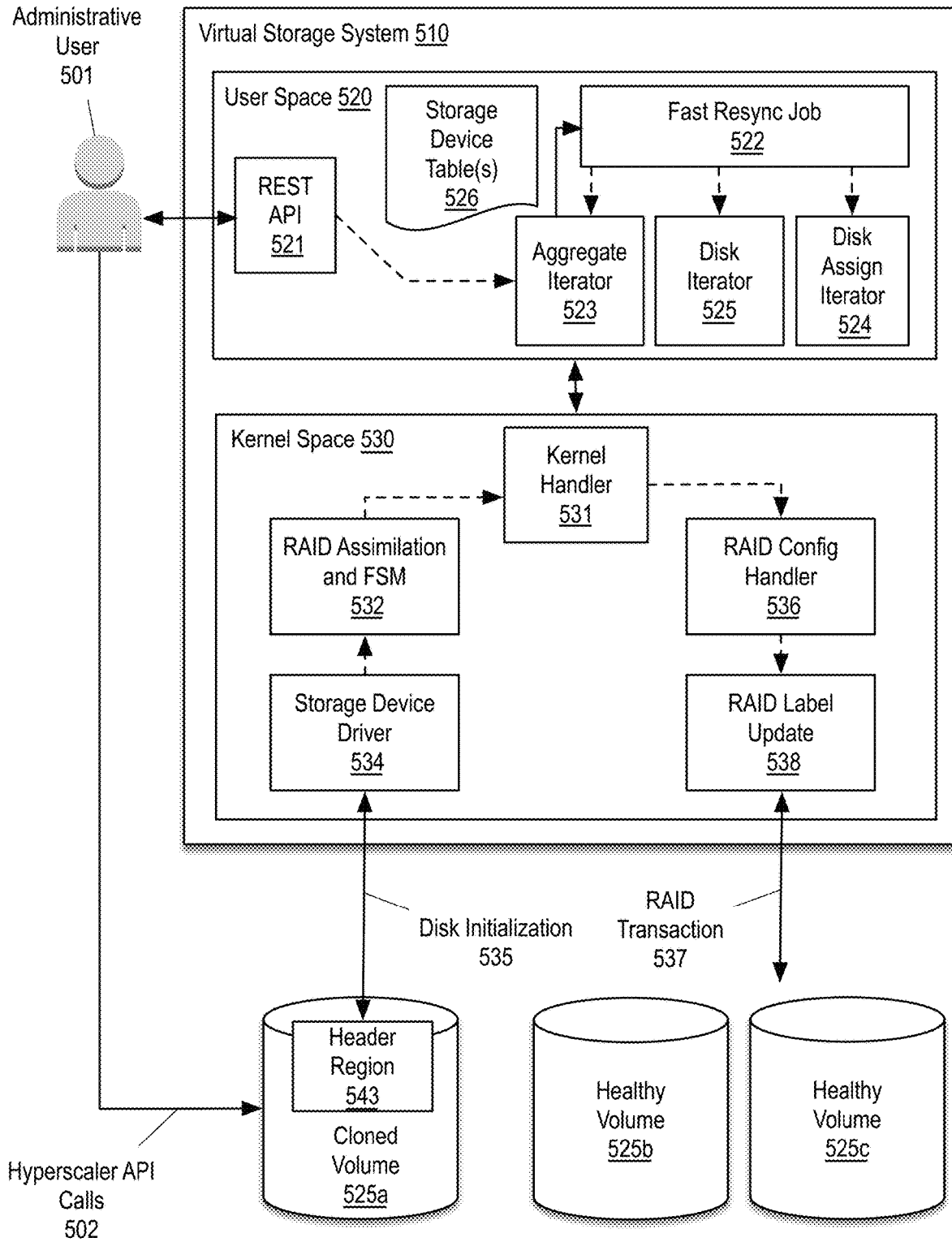
FIG. 5 is a block diagram illustrating an example of components that may be involved in a fast resync process in accordance with an embodiment of the present disclosure.

FIG. 5 is a block diagram illustrating an example of components that may be involved in a fast resync process in accordance with an embodiment of the present disclosure. In the context of the present example, a virtual storage system 510 (which may be analogous to virtual storage system 210*a*) includes user space components in a user space 520 of a storage operating system hosted, for example, within a virtual machine (VM) running within a guest operating system (e.g., FreeBSD) of a host computer system (not shown) and kernel space components in a kernel space 530. Of the storage operating system, As shown, the user space components may include a REST API 521, storage device table(s) 526, a fast resync job 522 (which may be analogous to fast resync job 322), an aggregate iterator 523, a disk iterator 525, and a disk assign iterator 524. As described further below with reference to FIG. 7, the REST API 521 may expose methods (e.g., PATCH and GET methods) through which an external actor (e.g., an administrative user 501, an automated script or third-party node) may request the virtual storage system 510 to: (i) temporarily take a specified mirrored aggregate (e.g., based on its UUID) offline (PATCH) to (a) allow disks of a healthy plex (e.g., plex 315*a*) of the specified mirrored aggregate to be cloned and (b) start the fast resync job 522 for the specified mirrored aggregate; (ii) obtain (GET) the volume IDs of the disks within the healthy plex of the specified mirrored aggregate after requesting the specified mirrored aggregate be taken offline; (iii) bring the mirrored aggregate back online (PATCH) after disk-level cloning has been completed; (iv) obtain (GET) the node ID of the virtual storage system associated with the failed plex (e.g., plex 315*b*); and obtain (GET) information regarding the mirrored aggregate resync state (e.g., inactive, offline_for_cloning, waiting_for_online, waiting_for_cloned_disks, assign_cloned_disks_in_progress, waiting_for_cloned_plex_online, resyncing, complete, and failed).

The storage device table(s) 526 may include the aggregate ID of the mirrored aggregate, the volume IDs of the disks within the mirrored aggregate, and the plex ID of the plex with which the disks are associated. The storage device table(s) 526 may be included within a configuration database (e.g., RDB 311 of FIG. 3), which may also include the node IDs of the virtual storage systems of the HA pair(s).

As described further below with reference to FIGS. 8A-C, the fast resync job 522 may be responsible for monitoring and/or directing various activities (e.g., causing a RAID layer to take the mirrored aggregate offline, checking for the mirrored aggregate coming back online, checking for cloned disks, initiating disk assignment to appropriate pools of disks, checking for plex online, checking for plex resync completion, returning associated error codes and/or job IDs), for example, via interactions with the aggregate iterator 523 and/or the disk assign iterator 524 and updating the status of the mirrored aggregate resync state at various stages of the fast resync process within a configuration database (e.g., RDB 311).

As shown and/or described further below with reference to FIGS. 8A-C, the aggregate iterator 523 may be responsible for handling external API requests/commands sent to the aggregate. Such requests may then be forwarded to appropriate handler functions (e.g., the fast resync job 522, the kernel handler 531, etc.). The disk iterator 525 may be responsible for checking on behalf of the fast resync job 522 whether the cloned disks (e.g., cloned volumes 327*a*-*n*) have been attached and are visible. The disk iterator 525 may also be used to get the state of a given disk (e.g., unassigned, assigned and whether it is assigned to a particular node).

As shown and/or described further below with reference to FIGS. 8A-C, the disk assign iterator 524 may be responsible for sending messages on behalf of the fast resync job 522 to the kernel layer to assign the cloned disks to the node and pool of disks associated with the failed plex.

As shown, the kernel space components may include a kernel handler 531, a RAID assimilation and finite state machine (FSM) module 532, a storage device driver, a RAID configuration handler 536, and a RAID label update module 538. The kernel handler 531 may be responsible for handling calls from the user space 520 and interacting with various other kernel space components.

The storage device driver 534, may be responsible for handling disk attach events and performing disk initialization 535, including, for example, validating and updating metadata (e.g., a volume ID) stored within a header region 543 of respective cloned volumes (e.g., cloned volume 525*a*), which may be created external to the virtual storage system 510, for example, via hyperscaler API calls 502 or off-box disk-level cloning tools in an on-prem environment.

The header region 543 may be reserved for use by the virtual storage system 510. According to one embodiment, the header region 543 may represent the first 4 KB block of a given storage device (e.g., one of cloud volumes 225), in this case, cloned volume 525*a*. The header region 543 may persist, among other things, across reboots a UUID of the disk (the volume ID), the backing storage device type (e.g., HDD or SSD) for the storage device at issue, and ownership information.

According to one embodiment, the storage device driver 534 may identify cloned disks based on one or more environment variables (e.g., bootargs) and/or the volume IDs of the disks. For example, a bootarg (e.g., "bootarg.vsa- .cloned_disks") may include a key value pair of all cloned disks' UIDs and volume IDs (e.g., in the form "UID1-VolID1;UID2-VolID2"). According to one embodiment, if the inserted disk matches one of the UUIDs, but doesn't match the Volume ID, then it may be recognized as a clone.

The RAID assimilation and FSM module 532 may be associated with the RAID layer (e.g., RAID layer 213). As described further below with reference to FIGS. 8A-C, after newly cloned and attached disks have been initialized by the storage device driver 534 and assigned to a pool of disks associated with the failed plex, the RAID assimilation and FSM module 532 may be responsible for flipping the plex IDs during assimilation of the newly cloned disks and starting the level-1 resync after the plex comes online.

The RAID configuration handler 536 may be associated with the RAID layer and may be responsible for receiving messages from user space to change the state of objects (e.g., offlining and onlining of a mirrored aggregate).

The RAID label update module 538 may be associated with the RAID layer and may be responsible for performing RAID transactions (e.g., RAID transaction 537) on healthy volumes (e.g., healthy volumes 525b and 525c). The RAID label update module 538 may be responsible for handling updates to a metadata portion of the disk where RAID labels are stored. For example, the RAID label update module 538 may be responsible for persisting RAID layer changes (e.g., the new flipped plex ID, aggregate state change) and other relevant metadata by writing them to specific metadata blocks on the disks.

Figure 7:
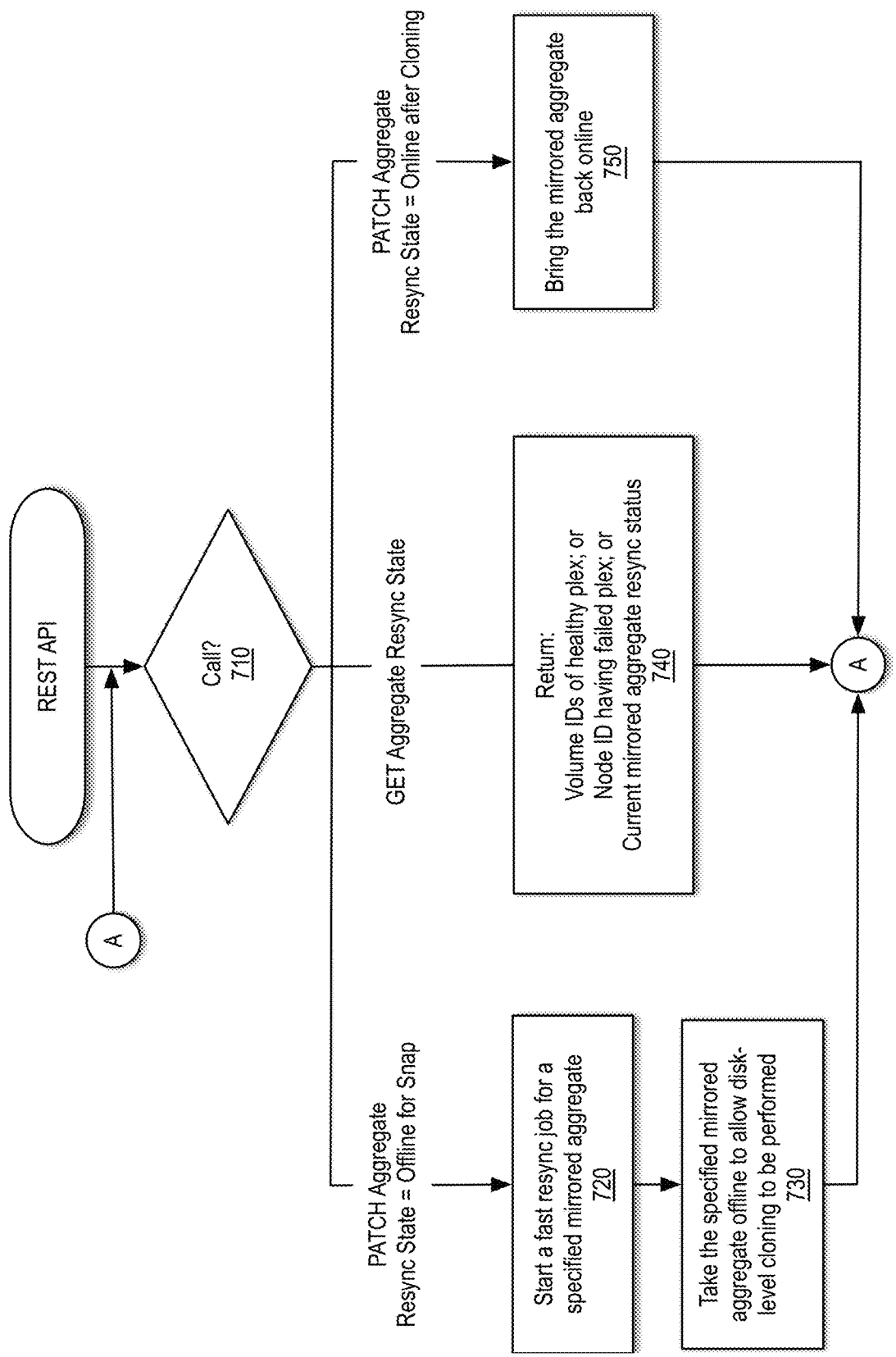
FIG. 7 is a flow diagram illustrating processing associated with various representational state transfer (REST) API calls in accordance with an embodiment of the present disclosure.
Figure 8A:
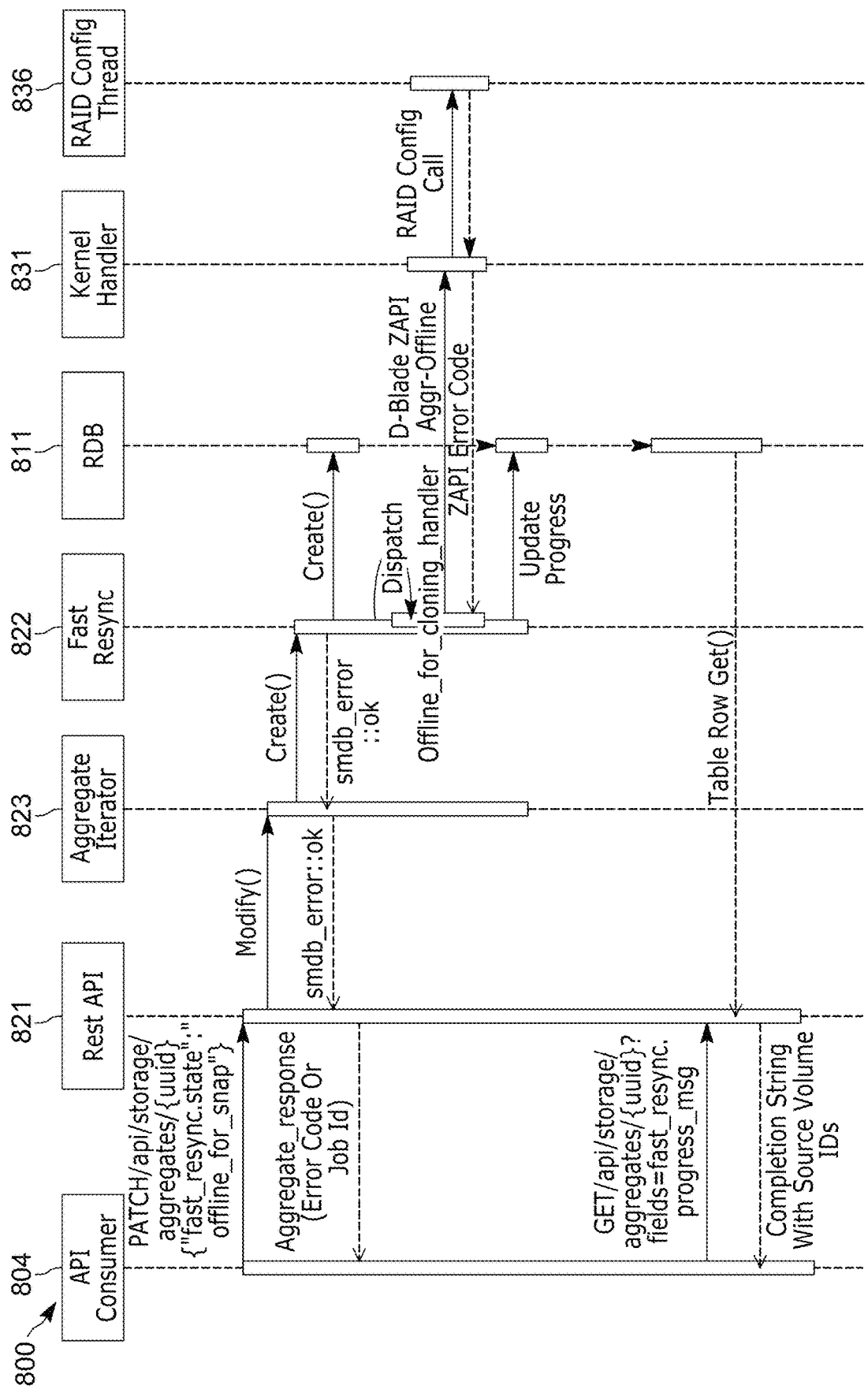
FIG. 8A is a message sequence diagram illustrating starting of a fast resync on an aggregate in accordance with an embodiment of the present disclosure.
Figure 8B:
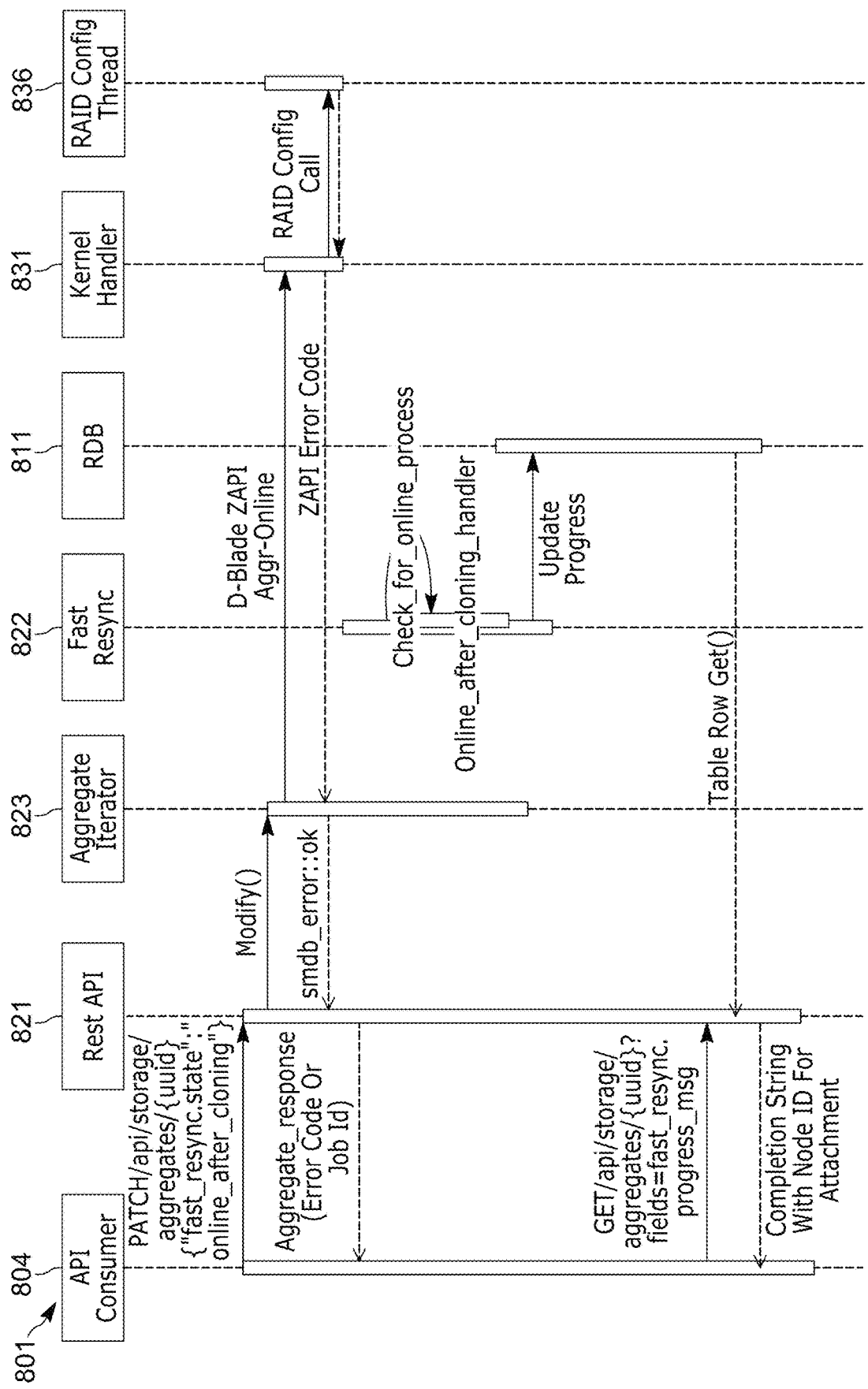
FIG. 8B is a message sequence diagram illustrating onlining of an aggregate after disk-level cloning of the disks of the healthy plex has been performed in accordance with an embodiment of the present disclosure.
Figure 8C:
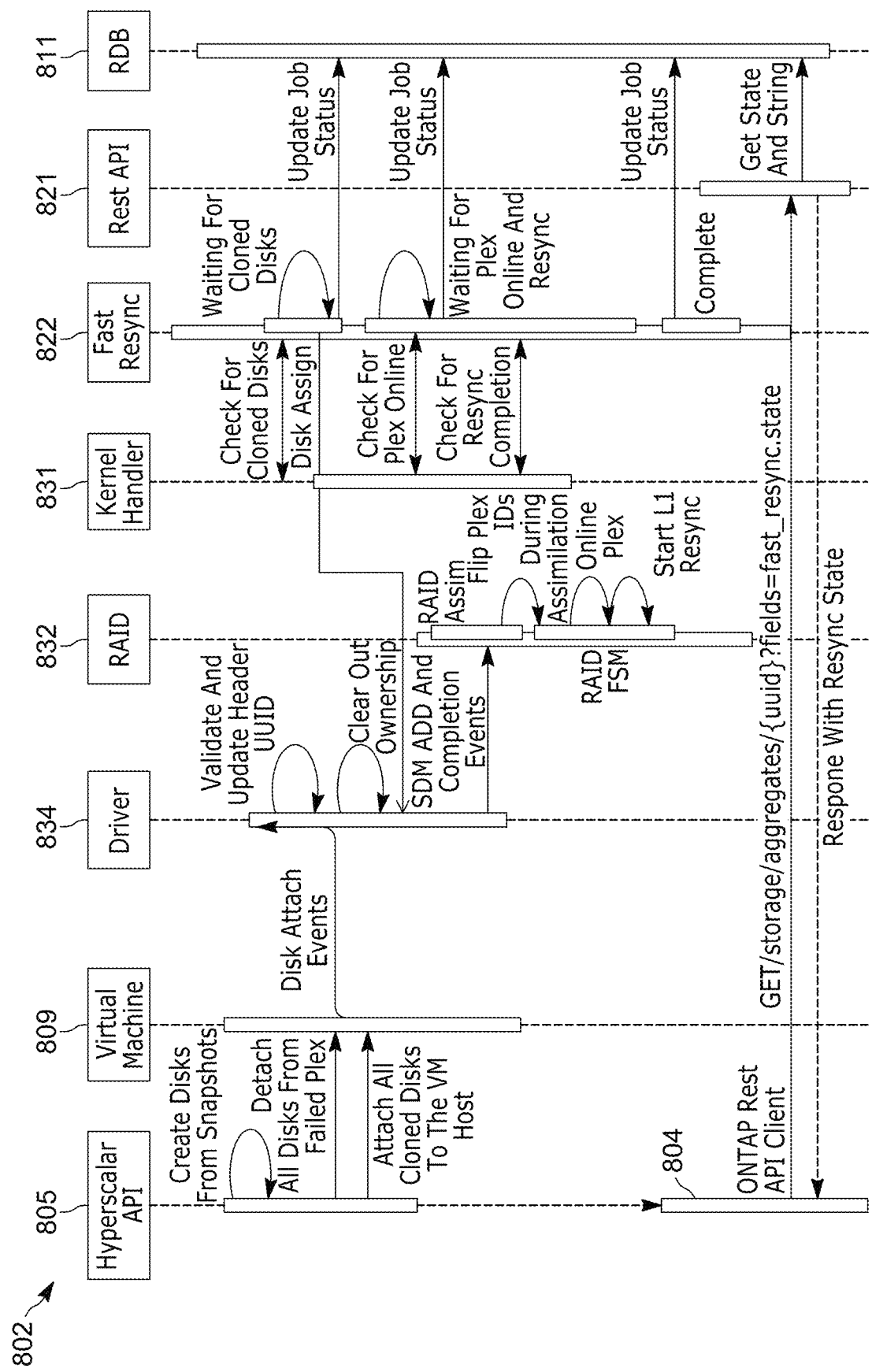
FIG. 8C is a message sequence diagram illustrating attaching cloned disks to an HA partner node having a failed plex in accordance with an embodiment of the present disclosure.

Various example message sequence diagrams illustrating interactions among the components of FIG. 5 are depicted by FIGS. 8A-C. The various layers described above with reference to FIG. 2, the various user space and kernel space components, and the processing described below with reference to the flow diagrams of FIGS. 4, 6A-B, and 7 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms (e.g., servers, blades, network storage systems or appliances, and storage arrays, such as the computer system described with reference to FIG. 9 below.

Example Event Handling by HA Partner Nodes

Figure 6A:
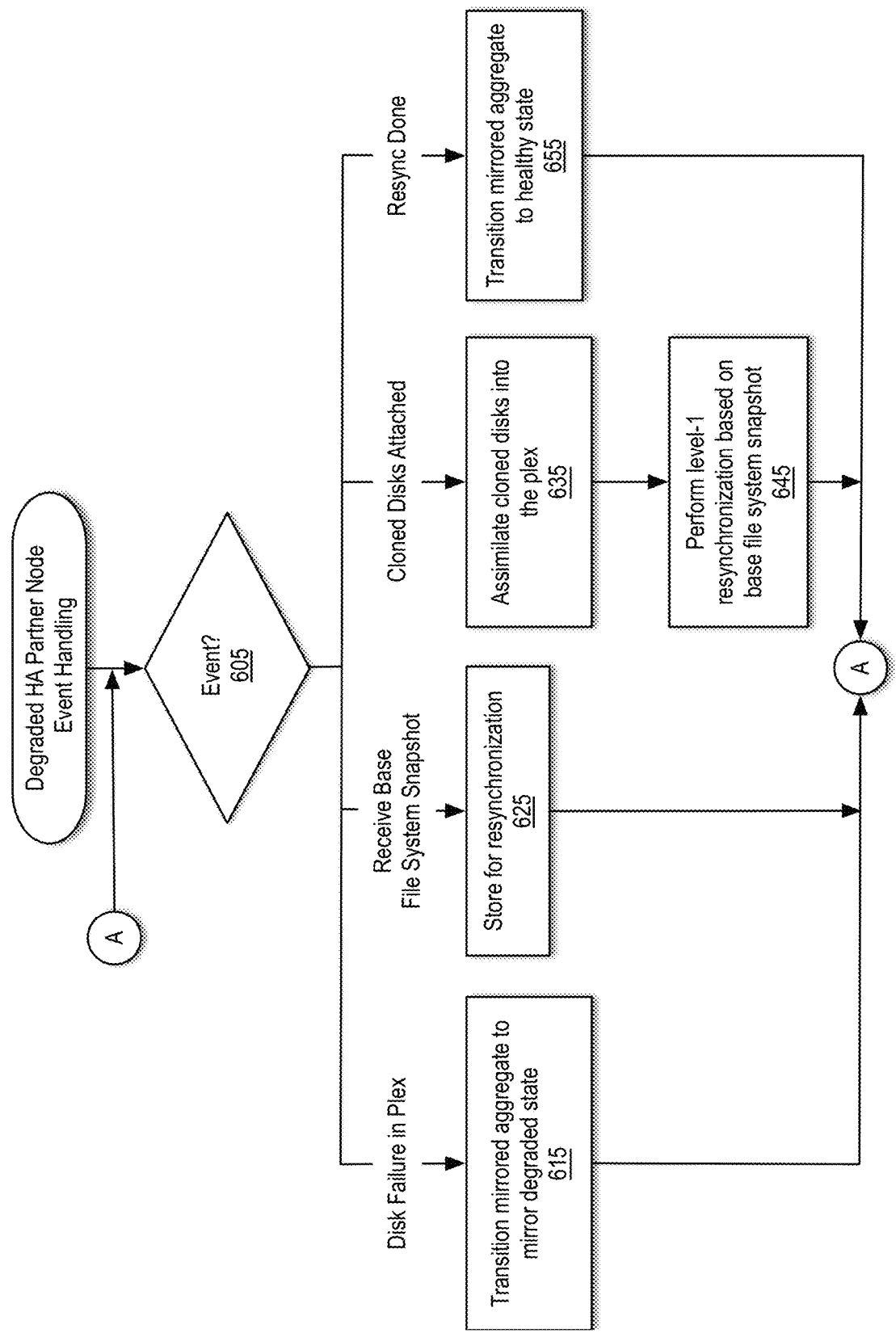
FIG. 6A is a flow diagram illustrating event handling on a degraded HA partner node in accordance with an embodiment of the present disclosure.

FIG. 6A is a flow diagram illustrating event handling on a degraded HA partner node in accordance with an embodiment of the present disclosure. In the context of the present example, it is assumed a distributed storage system includes an HA pair of nodes including a degraded HA partner node (e.g., virtual storage system 310a) that has experienced a disk failure in a plex (e.g., plex 315b) of a mirrored aggregate (e.g., mirrored aggregate 320) and a healthy HA partner node (e.g., virtual storage system 310b) for which all disks of an associated plex (e.g., plex 315a) are healthy.

At decision block 605, a determination is made regarding the nature of an event observed/detected by the degraded HA partner node. When the event represents a disk failure in a plex of the mirrored aggregate, processing continues with block 615. When the event represents receipt of a base file system snapshot from the other HA partner, processing continues with block 625. When the event represents cloned disks having been attached to a compute instance (e.g., a VM) hosting the degraded HA partner node, processing continues with block 635. When the event represents a completion of resynchronization of the mirrored aggregate, processing continues with block 655.

At block 615, responsive to the disk failure, the plex with which the failed disk is associated may also be treated as having failed and the mirrored aggregate is transitioned to a mirror degraded state. For example, when a disk failure is detected an indication regarding the mirror degraded state may be associated with the mirrored aggregate within a configuration database (e.g., RDB 311). This allows other nodes (e.g., the healthy HA partner node) of the distributed storage system to become aware of the change in state and take appropriate action. Following block 615, processing loops back to decision block 605 to process the next event.

At block 625, the base file system (aggregate-level) snapshot is stored for use in performing a resynchronization. Following block 625, processing loops back to decision block 605 to process the next event.

At block 635, the cloned disks are assimilated into the cloned plex. Because the cloned disks represent clones of disks of the healthy plex, they may include metadata that is inconsistent with that of the failed plex. In one embodiment, during the assimilation process, the plex IDs, for example, stored in a header region (e.g., header region 525a) are flipped. That is, the plex ID of the healthy plex is cleared or overwritten with that of the failed plex.

At block 645, a level-1 resynchronization is performed based on the base file system snapshot previously stored at block 625 and the attached cloned disks. This incremental recovery may be performed rather than a more time-consuming level-0 resync as a result of creation of disk-level clones of the disks of the healthy plex and attachment of the cloned disks to a compute instance hosting the degraded HA partner node (in the case of the distributed storage system being hosted within a hyperscaler (e.g., hyperscaler 220)) or the degraded HA partner node (in the case of the distributed storage system being operable in an on-prem environment). In one embodiment, the cloned disks are created external to the distributed storage system, for example, using native disk-level snapshot functionality of the hyperscaler or using available off-box disk-level cloning tools as appropriate for the environment. Following block 645, processing loops back to decision block 605 to process the next event.

At block 655, responsive to completion of the level-1 resynchronization, the mirrored aggregate is transitioned back into a healthy state. For example, when a resync completion is detected an indication regarding the healthy state may be associated with the mirrored aggregate within the configuration database, thereby allowing other nodes (e.g., the healthy HA partner node) of the distributed storage system to become aware of the change in state and take appropriate action. Following block 655, processing loops back to decision block 605 to process the next event.

Those skilled in the art will appreciate the events described above are merely exemplary and more or less event granularity may be provided depending upon the particular implementation.

Figure 6B:
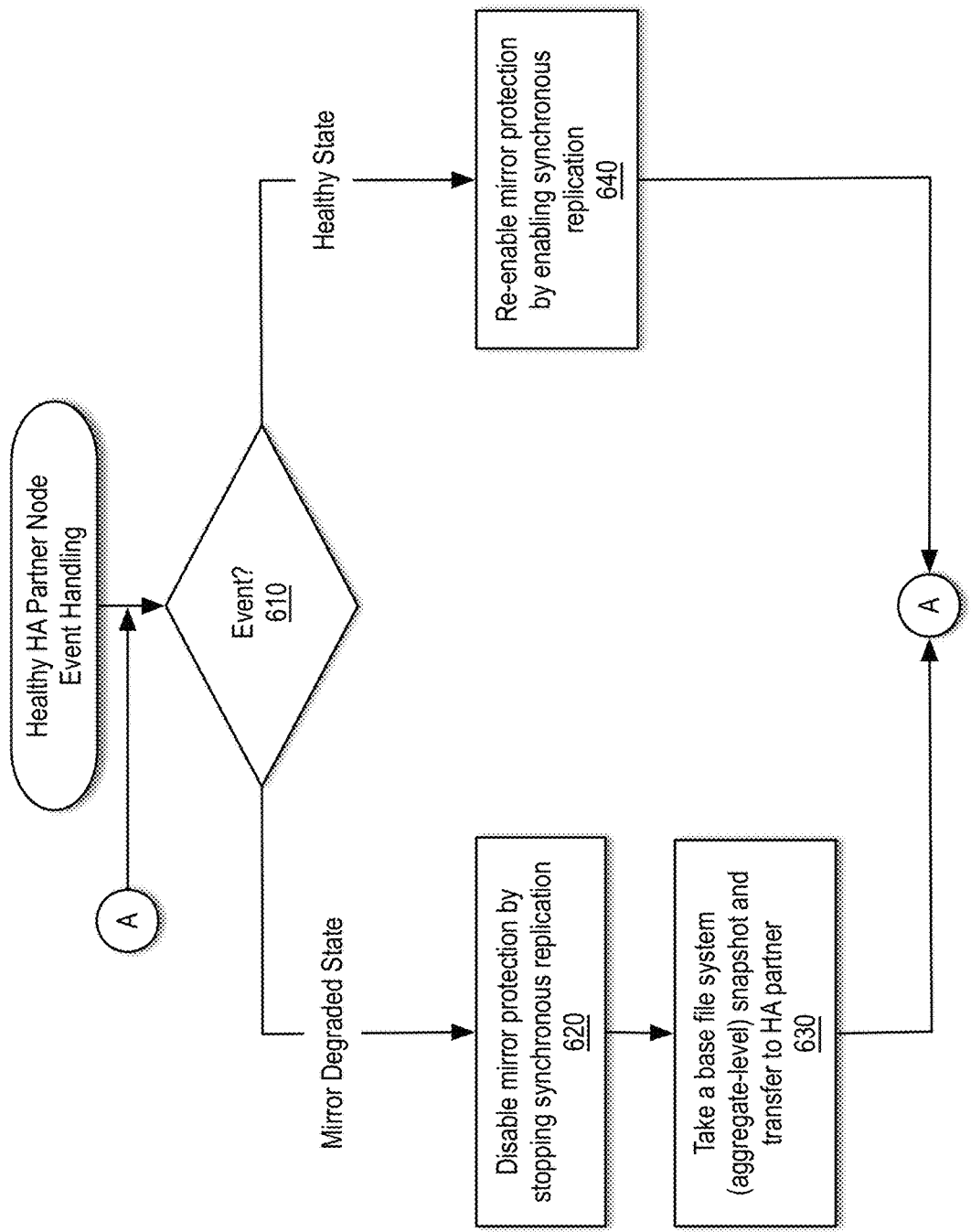
FIG. 6B is a flow diagram illustrating event handling on a healthy HA partner node in accordance with an embodiment of the present disclosure.

FIG. 6B is a flow diagram illustrating event handling on a healthy HA partner node in accordance with an embodiment of the present disclosure. At decision block 610, a determination is made regarding the nature of an event observed/detected by the healthy HA partner node. When the event represents a transition of the mirrored aggregate from the healthy state to the mirror degraded state, processing continues with block 620. When the event represents a transition of the mirrored aggregate from the mirror degraded state to the healthy state, processing continues with block 640.

At block 620, responsive to the transition of the mirrored aggregate to the mirror degraded state, mirror protection is disabled by stopping synchronous replication. That is, the plexes of the mirrored aggregate no longer represent a mirror copy and cannot be used to support HA, including, for example, a failover from the healthy HA partner node to the degraded HA partner node.

At block 630, to facilitate the level-1 resync of the mirrored aggregate by the degraded HA partner node, responsive to the transition of the mirrored aggregate to the mirror degraded state, a base file system (aggregate-level) snapshot of the disks associated with the healthy plex may be created and made available for use by (e.g., transferred to or otherwise made accessible to) the degraded HA partner node. Following block 630, processing loops back to decision block 610 to process the next event.

At block 640, responsive to the transition of the mirrored aggregate to the healthy state, mirror protection is re-enabled by commencing synchronous replication for the mirrored aggregate to maintain identical data content on both plexes of the mirrored aggregate.

It is to be appreciated various other events unrelated to recovery from a disk failure may be handled by either or both of the HA partner nodes; however, such other events are outside of the scope of the present disclosure.

Example Processing Responsive to REST API Calls

FIG. 7 is a flow diagram illustrating processing associated with various REST API calls in accordance with an embodiment of the present disclosure. As above, in the context of the present example, it is assumed a distributed storage system includes an HA pair of nodes including a degraded HA partner node (e.g., virtual storage system 310a) that has experienced a disk failure in a plex (e.g., plex 315b) of a mirrored aggregate (e.g., mirrored aggregate 320) and a healthy HA partner node (e.g., virtual storage system 310b) for which all disks of an associated plex (e.g., plex 315a) are healthy. It is further assumed an external actor (e.g., an administrative user 501, an automated script or third-party node) has been made aware of the permanent disk failure.

At decision block 710, depending on the call made to a REST API (e.g., REST API 521) exposed by the distributed storage system, processing continues with block 720, block 740, or block 750.

At block 720, responsive to invocation of a PATCH method of the REST API requesting the distributed storage system to take a specified mirrored aggregate offline, a fast resync job (e.g., fast resync job 311) is started for the specified mirrored aggregate.

At block 730, the specified mirrored aggregate is taken offline to allow disk-level cloning to be performed. Following block 730, processing loops back to decision block 710 to process the next call.

At block 740, responsive to invocation of a GET method of the REST API, depending on the circumstances, the volume IDs of the disks of the healthy plex are returned to the API consumer, the node ID of the storage system having the failed plex is returned, or the current mirrored aggregate resync status is returned to the API consumer. For example, in one embodiment, after invocation of the PATCH method to take the mirrored aggregate offline, the GET method returns the volume IDs of the disks of the healthy plex to facilitate taking of disk-level snapshots of the disks of the healthy plex and creation of disk clones corresponding to the disks of the healthy plex. After invocation of the PATCH method to bring the mirrored aggregate online after disk cloning has been completed, the GET method returns the node ID of the storage system having the failed plex. After the mirrored aggregate is back online, invocation of the GET method returns the current mirrored aggregate resync state (e.g., inactive, offline_for_cloning, waiting_for_online, waiting_for_cloned_disks, as sign_cloned_disks_in_progress, waiting_for_cloned_plex_online, resyncing, complete, and failed). Following block 740, processing loops back to decision block 710 to process the next call.

At block 750, responsive to invocation of the PATCH method of the REST API requesting the distributed storage system to bring the mirrored aggregate back online after disk-level snapshots have been created for the disks of the healthy plex, the mirrored aggregate is brought back online in preparation for attachment of the cloned disks to the degraded HA partner node. Following block 750, processing loops back to decision block 710 to process the next call.

Those skilled in the art will appreciate the PATCH and GET methods described in the context of the present example are merely exemplary and that more, fewer, and/or alternative methods may be exposed.

Example Message Sequence Between Components

FIG. 8A is a message sequence diagram 800 illustrating starting of a fast resync on an aggregate in accordance with an embodiment of the present disclosure. In the context of the present example, interactions are depicted among a number of components (e.g., an API consumer 804, a REST API 821, an aggregate iterator 823, a fast resync job 822, an RDB 811, a kernel handler 831, and a RAID configuration thread 836), which may be analogous to corresponding components of FIG. 5 and/or FIGS. 3A-J. For example, the API consumer 804 may be analogous to an external entity (e.g., administrative user 501, an automated script, third-party node) or an orchestration layer interposed between the external entity and the REST API 821, the REST API 821 may be analogous to REST API 521, the aggregate iterator 823 may be analogous to aggregate iterator 523, the fast resync job 822 may be analogous to fast resync job 522, the RDB 811 may be analogous to RDB 311, the kernel handler 831 may be analogous to kernel handler 531, and the RAID configuration thread 836 may be a kernel thread on which RAID layer (e.g., RAID layer 213) functions are carried out (e.g., configuration changes, assimilation and FSM functionalities).

FIG. 8B is a message sequence diagram 801 illustrating onlining of an aggregate after disk-level cloning of the disks of the healthy plex has been performed in accordance with an embodiment of the present disclosure.

FIG. 8C is a message sequence diagram 802 illustrating attaching cloned disks to an HA partner node having a failed plex in accordance with an embodiment of the present disclosure. FIG. 8C depicts additional components including a REST API client 804 that may make REST API calls to the distributed storage system, a hyperscaler API 805 through hyperscaler API calls (e.g., hyperscaler API calls 502) may be made, a virtual machine (VM) 809, and a RAID layer 832, which may be analogous to corresponding components of FIGS. 2, 5 and/or FIGS. 3A-J. For example, the REST API client 804 may be analogous to an external actor (e.g., the API consumer 804, the administrative user 501, or an automated script or third-party node), the hyperscaler API 805 may be analogous to API 223, and the RAID layer 832 may be analogous to RAID layer 213 and may include, for example, a RAID assimilation and FSM module (e.g., RAID assimilation and FSM module 532), a RAID configuration handler (e.g., RAID configuration handler 536), and a RAID label update module (e.g., RAID label update module 538). The VM 809 may represent a non-limiting example of compute instance on which a given virtual storage system (e.g., one or more of virtual storage systems 210a-n, virtual storage system 310a-b, virtual storage system 510) is running.

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 9:
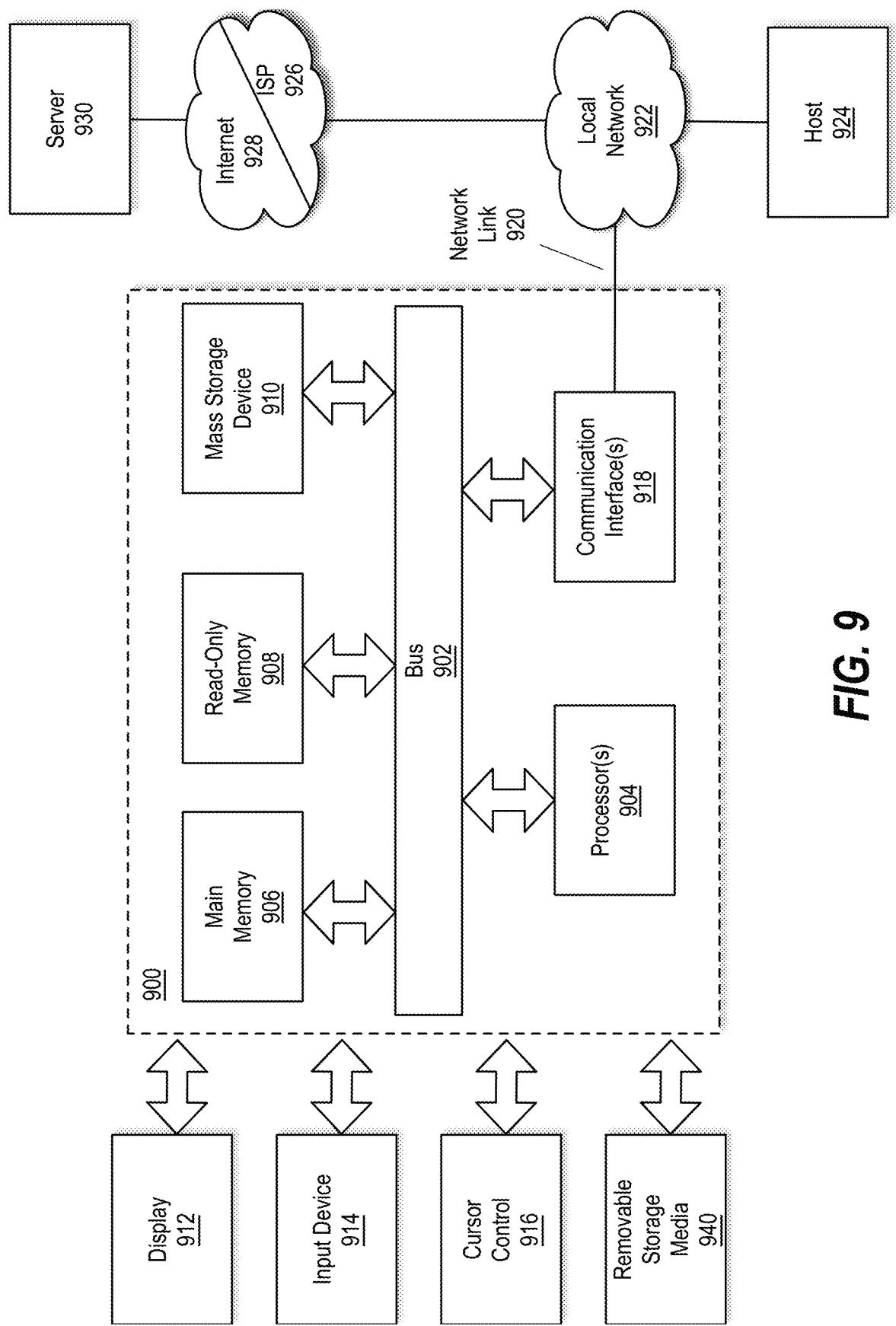
FIG. 9 illustrates an example computer system in which or with which embodiments of the present disclosure may be utilized.

FIG. 9 is a block diagram that illustrates a computer system 900 in which or with which an embodiment of the present disclosure may be implemented. Computer system 900 may be representative of all or a portion of the computing resources of a physical host on which a virtual storage system (e.g., one of virtual storage systems 210a-n, virtual storage systems 310a-b, and/or virtual storage system 510) of a distributed storage system is deployed. Notably, components of computer system 900 described herein are meant only to exemplify various possibilities. In no way should example computer system 900 limit the scope of the present disclosure. In the context of the present example, computer system 900 includes a bus 902 or other communication mechanism for communicating information, and a processing resource (e.g., a hardware processor 904) coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, e.g., a magnetic disk, optical disk or flash disk (made of flash memory chips), is provided and coupled to bus 902 for storing information and instructions.

Computer system 900 may be coupled via bus 902 to a display 912, e.g., a cathode ray tube (CRT), Liquid Crystal Display (LCD), Organic Light-Emitting Diode Display (OLED), Digital Light Processing Display (DLP) or the like, for displaying information to a computer user. An input device 914, including alphanumeric and other keys, is coupled to bus 902 for communicating information and command selections to processor 904. Another type of user input device is cursor control 916, such as a mouse, a trackball, a trackpad, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Removable storage media 940 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 900 may implement the techniques described herein using customized hard-wired logic, one or more ASICs or FPGAs, firmware or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 910. Volatile media includes dynamic memory, such as main memory 906. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the worldwide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. The received code may be executed by processor 904 as it is received, or stored in storage device 910, or other non-volatile storage for later execution.

All examples and illustrative references are non-limiting and should not be used to limit the applicability of the proposed approach to specific implementations and examples described herein and their equivalents. For simplicity, reference numbers may be repeated between various examples. This repetition is for clarity only and does not dictate a relationship between the respective examples.

Finally, in view of this disclosure, particular features described in relation to one aspect or example may be applied to other disclosed aspects or examples of the disclosure, even though not specifically shown in the drawings or described in the text.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Some embodiments pertain to Example 1 that includes a non-transitory machine readable medium storing instructions, which when executed by one or more processing resource of a distributed storage system, cause the distributed storage system to: maintain a mirrored aggregate of redundant array of independent disks (RAID) level 0 for a high-availability (HA) pair of nodes of the distributed storage system, the mirrored aggregate including a first plurality of disks associated with a first HA partner node of the HA pair and a second plurality of disks associated with a second HA partner node of the HA pair; after mirror protection provided by the mirrored aggregate is no longer available as a result of a failure of a disk within the first plurality of disks, determine a plurality of cloned disks have been attached to the first HA partner node, wherein each cloned disk of the plurality of cloned disks represents a disk-level clone of a corresponding disk of the second plurality of disks; and re-establish the mirror protection based at least in part on the plurality of cloned disks.

Example 2 includes the subject matter of Example 1, wherein re-establishment of the mirror protection comprises: assimilating the plurality of cloned disks within the first plurality of disks; and resynchronizing the mirrored aggregate by performing a level-1 resynchronization of the first plurality of disks with the second plurality of disks based on a base file system snapshot of the second plex.

Example 3 includes the subject matter of Example 2, wherein the base file system snapshot is triggered responsive to determining unavailability of the mirror protection.

Example 4 includes the subject matter of any of Examples 1-3, wherein the distributed storage system is hosted by a hyperscaler and wherein the plurality of cloned disks are created using native snapshot functionality exposed by the hyperscaler via an application programming interface (API) or a command-line interface (CLI).

Example 5 includes the subject matter of any of Examples 1-4, wherein the instructions further cause the distributed storage system to facilitate automation of creation of the plurality of cloned disks by returning volume identifiers (IDs) of the second plurality of disks responsive to receipt of a first request via an API or a CLI exposed by the distributed storage system.

Example 6 includes the subject matter of any of Examples 1-5, wherein the instructions further cause the distributed storage system to facilitate automation in connection with attaching the plurality of cloned disks to the first HA partner node by returning a node ID of the first HA partner node responsive to receipt of a second request via the API or the CLI exposed by the distributed storage system.

Example 7 includes the subject matter of any of Examples 1-6, wherein the instructions further cause the distributed storage system to prior to assimilation of the plurality of cloned disks, update metadata within a header of each cloned disk of the plurality of cloned disks.

Example 8 includes the subject matter of Example 7, wherein the update of the metadata includes writing out a newly generated disk universally unique identifier (UUID) to the header of each cloned disk of the plurality of cloned disks.

Example 9 includes the subject matter of any of Examples 1-8, wherein the instructions further cause the distributed storage system to during the assimilation of the plurality of cloned disks, write a plex ID of the first plex to the header of each cloned disk of the plurality of cloned disks.

Some embodiments pertain to Example 10 that includes a method comprising: maintaining, by a high-availability (HA) pair of nodes of a distributed storage system, a mirrored aggregate including a first plex having a first redundant array of independent disks (RAID) group associated with a first HA partner node of the HA pair and a second plex having a second RAID group associated with a second HA partner node of the HA pair; after mirror protection provided by the mirrored aggregate is no longer available as a result of a failure of a disk within the first RAID group, determining a plurality of cloned disks have been attached to the first HA partner node, wherein each cloned disk of the plurality of cloned disks represents a disk-level clone of a corresponding disk of the second plex; and re-establishing the mirror protection by: assimilating the plurality of cloned disks within the first plex; and resynchronizing the mirrored aggregate by performing a resynchronization of the first plex with the second plex based on a base file system snapshot of the second plex.

Example 11 includes the subject matter of Example 10, wherein the base file system snapshot is triggered responsive to determining unavailability of the mirror protection.

Example 12 includes the subject matter of any of Examples 10-11, wherein the distributed storage system is hosted by a hyperscaler and wherein the plurality of cloned disks are created using native snapshot functionality exposed by the hyperscaler via an application programming interface (API) or a command-line interface (CLI).

Example 13 includes the subject matter of any of Examples 10-12, further comprising facilitating automation of creation of the plurality of cloned disks by returning volume identifiers (IDs) of a plurality of disks within the second RAID group responsive to receipt of a first request via an API or a CLI exposed by the distributed storage system.

Example 14 includes the subject matter of any of Examples 10-13, further comprising facilitating automation in connection with attaching the plurality of cloned disks to the first HA partner node by returning a node ID of the first HA partner node responsive to receipt of a second request via the API or the CLI exposed by the distributed storage system.

Example 15 includes the subject matter of any of Examples 10-14, wherein prior to assimilation of the plurality of cloned disks, updating metadata within a header of each cloned disk of the plurality of cloned disks.

Example 16 includes the subject matter of Example 15, wherein said updating includes the metadata includes writing out a newly generated disk universally unique identifier (UUID) to the header of each cloned disk of the plurality of cloned disks.

Example 17 includes the subject matter of any of Examples 10-16, wherein during the assimilation of the plurality of cloned disks, writing a plex ID of the first plex to the header of each cloned disk of the plurality of cloned disks.

Some embodiments pertain to Example 18 that includes a distributed storage system comprising: one or more processing resources; and instructions that when executed by the one or more processing resources cause the distributed storage system to: maintain a mirrored aggregate of redundant array of independent disks (RAID) level 0 for a high-availability (HA) pair of nodes of the distributed storage system, the mirrored aggregate including a first plurality of disks associated with a first HA partner node of the HA pair and a second plurality of disks associated with a second HA partner node of the HA pair; after mirror protection provided by the mirrored aggregate is no longer available as a result of a failure of a disk within the first plurality of disks, determine a plurality of cloned disks have been attached to the first HA partner node, wherein each cloned disk of the plurality of cloned disks represents a disk-level clone of a corresponding disk of the second plurality of disks; and re-establish the mirror protection based at least in part on the plurality of cloned disks.

Example 19 includes the subject matter of Example 18, wherein re-establishment of the mirror protection comprises: assimilating the plurality of cloned disks within the first plurality of disks; and resynchronizing the mirrored aggregate by performing a level-1 resynchronization of the first plurality of disks with the second plurality of disks based on a base file system snapshot of the second plex.

Example 20 includes the subject matter of Example 19, wherein the base file system snapshot is triggered responsive to determining unavailability of the mirror protection.

Example 21 includes the subject matter of any of Examples 18-20, wherein the first HA partner node and the second HA partner node are hosted by respective compute instances of a hyperscaler and wherein the plurality of cloned disks are created using native snapshot functionality of the hyperscaler.

Example 22 includes the subject matter of any of Examples 18-22, wherein the instructions further cause the distributed storage system to prior to assimilation of the plurality of cloned disks, update metadata within a header of each cloned disk of the plurality of cloned disks.

Example 23 includes the subject matter of Example 22, wherein the update of the metadata includes writing out a newly generated disk universally unique identifier (UUID) to the header of each cloned disk of the plurality of cloned disks.

Example 24 includes the subject matter of any of Examples 18-23, wherein the instructions further cause the distributed storage system to during the assimilation of the plurality of cloned disks, write a plex ID of the first plex to the header of each cloned disk of the plurality of cloned disks.

Some embodiments pertain to Example 25 that includes an apparatus that implements or performs a method of any of Examples 10-17.

Some embodiments pertain to Example 26 that includes an apparatus comprising means for performing a method as claimed in any of Examples 10-17.

Some embodiments pertain to Example 27 that includes at least one machine-readable medium comprising a plurality of instructions, when executed on a computing device, implement or perform a method or realize an apparatus as described in any preceding Example.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A non-transitory machine readable medium storing instructions, which when executed by one or more processing resource of a distributed storage system, cause the distributed storage system to:
maintain a mirrored aggregate of redundant array of independent disks (RAID) level 0 for a high-availability (HA) pair of nodes of the distributed storage system, the mirrored aggregate including a first plurality of disks associated with a first HA partner node of the HA pair and a second plurality of disks associated with a second HA partner node of the HA pair;
after minor protection provided by the mirrored aggregate is no longer available as a result of a failure of a disk within the first plurality of disks, determine a plurality of cloned disks have been attached to the first HA partner node, wherein each cloned disk of the plurality of cloned disks represents a disk-level clone of a corresponding disk of the second plurality of disks; and
re-establish the mirror protection based at least in part on the plurality of cloned disks.

2. The non-transitory machine readable medium of claim 1,
wherein re-establishment of the minor protection comprises:
assimilating the plurality of cloned disks within the first plurality of disks; and
resynchronizing the mirrored aggregate by performing a level-1 resynchronization of the first plurality of disks with the second plurality of disks based on a base file system snapshot of a second plex, with which the second plurality of disks are associated.

3. The non-transitory machine readable medium of claim 2, wherein the base file system snapshot is triggered responsive to determining unavailability of the minor protection.

4. The non-transitory machine readable medium of claim 1, wherein the distributed storage system is hosted by a hyperscaler and wherein the plurality of cloned disks are created using native snapshot functionality exposed by the hyperscaler via an application programming interface (API) or a command-line interface (CLI).

5. The non-transitory machine readable medium of claim 4, wherein the instructions further cause the distributed storage system to facilitate automation of creation of the plurality of cloned disks by returning volume identifiers (IDs) of the second plurality of disks responsive to receipt of a first request via a second API or a second CLI exposed by the distributed storage system.

6. The non-transitory machine readable medium of claim 4, wherein the instructions further cause the distributed storage system to facilitate automation in connection with attaching the plurality of cloned disks to the first HA partner node by returning a node ID of the first HA partner node responsive to receipt of a second request via the second API or the second CLI exposed by the distributed storage system.

7. The non-transitory machine readable medium of claim 1, wherein the instructions further cause the distributed storage system to e prior to assimilation of the plurality of cloned disks, update metadata within a header of each cloned disk of the plurality of cloned disks.

8. The non-transitory machine readable medium of claim 7, wherein the update of the metadata includes writing out a newly generated disk universally unique identifier (UUDI) to the header of each cloned disk of the plurality of cloned disks.

9. The non-transitory machine readable medium of claim 7, wherein the instructions further cause the distributed storage system to, during the assimilation of the plurality of cloned disks, write a plex ID of a first plex, with which the first plurality of disks are associated, to the header of each cloned disk of the plurality of cloned disks.

10. A method comprising:
maintaining, by a high-availability (HA) pair of nodes of a distributed storage system, a mirrored aggregate including a first plex having a first redundant array of independent disks (RAID) group associated with a first HA partner node of the HA pair and a second plex having a second RAID group associated with a second HA partner node of the HA pair;
after minor protection provided by the mirrored aggregate is no longer available as a result of a failure of a disk within the first RAID group, determining a plurality of cloned disks have been attached to the first HA partner node, wherein each cloned disk of the plurality of cloned disks represents a disk-level clone of a corresponding disk of the second plex; and
re-establishing the mirror protection by:
assimilating the plurality of cloned disks within the first plex; and
resynchronizing the mirrored aggregate by performing a resynchronization of the first plex with the second plex based on a base file system snapshot of the second plex.

11. The method of claim 10, wherein the base file system snapshot is triggered responsive to determining unavailability of the minor protection.

12. The method of claim 10, wherein the distributed storage system is hosted by a hyperscaler and wherein the plurality of cloned disks are created using native snapshot functionality exposed by the hyperscaler via an application programming interface (API) or a command-line interface (CLI).

13. The method of claim 12, further comprising facilitating automation of creation of the plurality of cloned disks by returning volume identifiers (IDs) of a plurality of disks within the second RAID group responsive to receipt of a first request via a second API or a second CLI exposed by the distributed storage system.

14. The method of claim 13, further comprising facilitating automation in connection with attaching the plurality of cloned disks to the first HA partner node by returning a node ID of the first HA partner node responsive to receipt of a second request via the second API or the second CLI exposed by the distributed storage system.

15. The method of claim 13, wherein prior to assimilation of the plurality of cloned disks, updating metadata within a header of each cloned disk of the plurality of cloned disks.

16. The method of claim 15, wherein said updating includes the metadata includes writing out a newly generated disk universally unique identifier (UUDI) to the header of each cloned disk of the plurality of cloned disks.

17. The method of claim 15, wherein during the assimilation of the plurality of cloned disks, writing a plex ID of the first plex to the header of each cloned disk of the plurality of cloned disks.

18. A distributed storage system comprising:
one or more processing resources; and
instructions that when executed by the one or more processing resources cause the distributed storage system to:
maintain a mirrored aggregate of redundant array of independent disks (RAID) level 0 for a high-availability (HA) pair of nodes of the distributed storage system, the mirrored aggregate including a first plurality of disks associated with a first HA partner node of the HA pair and a second plurality of disks associated with a second HA partner node of the HA pair;
after mirror protection provided by the mirrored aggregate is no longer available as a result of a failure of a disk within the first plurality of disks, determine a plurality of cloned disks have been attached to the first HA partner node, wherein each cloned disk of the plurality of cloned disks represents a disk-level clone of a corresponding disk of the second plurality of disks; and
re-establish the minor protection based at least in part on the plurality of cloned disks.

19. The distributed storage system of claim 18, wherein re-establishment of the minor protection comprises:
assimilating the plurality of cloned disks within the first plurality of disks; and
resynchronizing the mirrored aggregate by performing a level-1 resynchronization of the first plurality of disks with the second plurality of disks based on a base file system snapshot of a second plex, with which the second plurality of disks are associated.

20. The distributed storage system of claim 19, wherein the base file system snapshot is triggered responsive to determining unavailability of the minor protection.

21. The distributed storage system of claim 18, wherein the first HA partner node and the second HA partner node are hosted by respective compute instances of a hyperscaler and wherein the plurality of cloned disks are created using native snapshot functionality of the hyperscaler.

22. The distributed storage system of claim 18, wherein the instructions further cause the distributed storage system to, prior to assimilation of the plurality of cloned disks, update metadata within a header of each cloned disk of the plurality of cloned disks.

23. The distributed storage system of claim 22, wherein the update of the metadata includes writing out a newly generated disk universally unique identifier (UUDI) to the header of each cloned disk of the plurality of cloned disks.

24. The distributed storage system of claim 22, wherein the instructions further cause the distributed storage system to e during the assimilation of the plurality of cloned disks, write a plex ID of a first plex, with which the first plurality of disks are associated, to the header of each cloned disk of the plurality of cloned disks.

\* \* \* \* \*

UNITED STATES PATENT AND TRADEMARK OFFICE
CERTIFICATE OF CORRECTION

PATENT NO. : 12,045,489 B2
APPLICATION NO. : 18/060367
DATED : July 23, 2024
INVENTOR(S) : Sangramsinh Pandurang Pawar et al.

Page 1 of 1

It is certified that error appears in the above-identified patent and that said Letters Patent is hereby corrected as shown below:

In the Claims

Column 25, Line 39 should be changed from "after minor protection" to --after mirror protection--

Column 25, Line 50 should be changed from "wherein re-establishment of the minor protection" to --wherein re-establishment of the mirror protection--

Column 25, Line 61 should be changed from "of the minor protection" to --of the mirror protection--

Column 26, Line 39 should be changed from "after minor protection" to --after mirror protection--

Column 26, Line 55 should be changed from "of the minor protection" to --of the mirror protection--

Column 28, Line 1 should be changed from "re-establish the minor protection" to --re-establish the mirror protection--

Column 28, Line 4 should be changed from "re-establishment of the minor protection comprises:" to --re-establishment of the mirror protection comprises:--

Column 28, Line 16 should be changed from "of the minor protection" to --of the mirror protection--

Signed and Sealed this
Twenty-fourth Day of September, 2024

Katherine Kelly Vidal
*Director of the United States Patent and Trademark Office*